US012361803B2

(12) United States Patent
Nallusamy et al.

(10) Patent No.: US 12,361,803 B2
(45) Date of Patent: Jul. 15, 2025

(54) RESPONSE MANAGEMENT IN AN INDOOR FACILITY

(71) Applicant: HONEYWELL INTERNATIONAL INC., Charlotte, NC (US)

(72) Inventors: Vijay Nallusamy, Bangalore (IN); Sivakumar Kanagarajan, Bangalore (IN); Gobinathan Baladhandapani, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 59 days.

(21) Appl. No.: 18/202,305

(22) Filed: May 26, 2023

(65) Prior Publication Data

US 2024/0395121 A1 Nov. 28, 2024

(51) Int. Cl.
| | |
|---|---|
| *G06Q 50/163* | (2024.01) |
| *B64U 101/20* | (2023.01) |
| *B64U 101/31* | (2023.01) |
| *G06V 10/70* | (2022.01) |
| *G06V 20/56* | (2022.01) |
| *G08B 3/10* | (2006.01) |
| *G08B 5/36* | (2006.01) |
| *G08B 7/06* | (2006.01) |

(52) U.S. Cl.
CPC .......... *G08B 7/062* (2013.01); *G06Q 50/163* (2013.01); *G06V 10/70* (2022.01); *G06V 20/56* (2022.01); *G08B 3/10* (2013.01); *G08B 5/36* (2013.01); *B64U 2101/20* (2023.01); *B64U 2101/31* (2023.01)

(58) Field of Classification Search
CPC ............ B64U 2101/31; B64U 2101/20; B64U 2101/70; G06Q 50/163
See application file for complete search history.

(56) References Cited

U.S. PATENT DOCUMENTS

| | | | |
|---|---|---|---|
| 9,805,582 B2 * | 10/2017 | Jewdab ........... | G08B 13/19654 |
| 10,378,906 B2 * | 8/2019 | O'Brien ............ | G06K 7/10821 |
| 10,810,679 B1 * | 10/2020 | Farnsworth ............ | G09C 5/00 |
| 11,100,784 B2 * | 8/2021 | Mondal ................ | G08B 29/183 |
| 11,769,324 B2 * | 9/2023 | Mercado ................ | G06V 20/20 |
| | | | 382/103 |
| 11,845,547 B1 * | 12/2023 | Matheson .............. | G06Q 40/08 |

\* cited by examiner

*Primary Examiner* — John A Tweel, Jr.
(74) *Attorney, Agent, or Firm* — ALSTON & BIRD LLP

(57) ABSTRACT

Techniques for response management in an indoor facility are described. A server device processes a signal from an unmanned vehicle to deduce occurrence of an actionable event. A preliminary location of the occurrence of the actionable event is determined based on an instantaneous position of the unmanned vehicle at the time of transmitting the signal. The inputs obtained from a set of static sensors located in proximity to the preliminary location is processed to verify the occurrence of the actionable event. A verified location of the occurrence of the actionable event is determined based on the preliminary location of the occurrence of the actionable event and an actual location of the set of static sensors within the indoor facility. The server device triggers an alert to indicate the occurrence of the actionable event, wherein the alert comprises the verified location of the occurrence of the event.

20 Claims, 9 Drawing Sheets

RESPONSE MANAGEMENT IN AN INDOOR FACILITY

BACKGROUND

Indoor facility, for example, warehouse, industrial plants, buildings, like gated community buildings, multistoried buildings, and the like, indoor recreation facility, and so on, may have to be constantly monitored for ensuring successful operations and/or to address various situations. For instance, warehouse is a facility for safely storing inventory, such as raw materials, finished product, packed materials, and the like, for commercial purposes prior to distributing them to buyers' location. For successful warehouse operations, various activities and/or parameters, such as inventory list, tools available in the warehouse, personnel available in the warehouse for movement of goods, workload information of the personnel, and so on, may have to be constantly monitored. Similarly, in an industrial plant, one or more components are to be manufactured and/or assembled. For successful plant operations, various activities and/or parameters, such as bill of materials, tools available, workers available, machines requiring service, and the like, may have to be continuously monitored.

Moreover, safety of the indoor facility is critical to the indoor facility management. If any mishaps or untoward incidents occur in the indoor facility, the goods may be damaged and/or safety of the personnel in the indoor facility may be endangered. Such incidents compromise the overall safety of the indoor facility. Accordingly, robust management of indoor facility is important for efficient functioning of the indoor facility.

SUMMARY

In accordance with the present subject matter, an unmanned vehicle that is movable in a space within the indoor facility may transmit a signal. The unmanned vehicle may, for example, include Unmanned Aerial Vehicle (UAV), an autonomous vehicle, such as an automated guided vehicle, an autonomous mobile robot, an autonomous fork truck, a robotic truck loader/unloader, a towing automatic guided vehicle, or a combination thereof.

The signal that is transmitted may be for example, an audio signal or a visual signal. The unmanned vehicle may transmit the signal to a server device. In an example, the server device may be part of a local server device that is disposed within the indoor facility. In another example, the server device may be a cloud server device that is to receive the signal through a network.

The server device may detect if an actionable event has occurred. The actionable event may be, for example, a fire breakout in the indoor facility, an unauthorized person accessing the indoor facility, falling of one or more heavy goods from the rack in the indoor facility, a falling of a rack in the indoor facility, a distress call from a person in the indoor facility due to events, such as a fire breakout, blocking of a path in the indoor facility, accidents occurred to the personnel, like falling of a rack in the indoor facility on the personnel, and the like. In this regard, the server device may process the signal received from the unmanned vehicle to deduce occurrence of the actionable event.

In an aspect, the server device may deploy a processing model to process the received signal to deduce the occurrence of the actionable event. The processing model may be, for example, an audio processing model, an image processing model, or a combination thereof.

In another aspect, the server device may determine a preliminary location of the occurrence of the actionable event from the signal received from the unmanned vehicle. In an example, the preliminary location may be determined based on an instantaneous position of the unmanned vehicle at a time of the transmission of the signal by the unmanned vehicle. The instantaneous location of the unmanned vehicle may be determined using localization beacon. The localization beacon may be, for example, a wireless fidelity (Wi-fi) beacon, Bluetooth beacon, an ultra-wide band (UWB), a Chirp Spread Spectrum (CSS) or any other type of localization beacon. A plurality of localization beacons may be disposed at various locations in the indoor facility.

Upon the determination of the preliminary location of the actionable event, a verified location of occurrence of the actionable event may be determined. In this regard, inputs from a set of static sensors disposed within the indoor facility may be used. Particularly, the inputs from the set of static sensors in proximity of the preliminary location of the occurrence of the actionable event may be used. The set of static sensors may be one or more static sensors that may be used. The set of static sensors may also be of one or more types. For instance, the set of static sensors may include one or more sound sensors, one or more imaging sensors, one or more Wi-fi beacons, one or more Bluetooth beacons, one or more UWBs, one or more CSS, or a combination thereof.

A processing model may be deployed to process inputs from the set of static sensors to verify the occurrence of the actionable event. The processing model may be, for example, an audio processing model, an image processing model, or a combination thereof.

The server device may determine the verified location of the occurrence of the critical actionable event in response to the verification of the occurrence of the actionable event. The verified location may be determined based on the preliminary location of the occurrence of the actionable event and an actual location of the set of static sensors within the indoor facility. In certain scenarios, inputs only from a few of the set of sensors may be helpful in the verification of the occurrence of the actionable event while inputs from rest of the set of the sensors may not be helpful in the verification of the occurrence of the actionable event. In such scenarios, the server device may identify the relevant set of static sensors from the set of static sensors based on the inputs from the relevant set of static sensors being usable for verification of the occurrence of the actionable event. The server device may determine an actual location of a relevant set of static sensors from the set of static sensors. The verified location of occurrence of the actionable event may be determined based on the preliminary location of occurrence of the actionable event and the actual location of the relevant set of static sensors.

The server device may trigger an alert for sending to an event response system to indicate the occurrence of the actionable event. The alert may include verified location of occurrence of the event. The alert may be raised with stake holders, such as an emergency rescue team, to take an appropriate action.

In an example, the triggering may include prompting illumination of a selected light from amongst a plurality of lights disposed at a plurality of locations in the indoor facility. The selected light may be disposed in proximity to the verified location of the occurrence of the actionable event. In an example, the triggering may include prompting illumination of a set of lights that are disposed within a threshold distance from the verified location of the occurrence of the actionable event. Accordingly, the selected light(s) may be turned on. The prompting may be done through a light controller that is operably coupled with and that controls the plurality of lights.

In some circumstances, the present subject matter provides guidance during the occurrence of the actionable event. The server device may provide guidance instructions regarding the actionable event based on the determined verified location of the occurrence of the actionable event and a route map of the indoor facility. The guidance instructions may be provided to an emergency rescue team, people stuck inside the indoor facility due to the occurrence of the actionable event, or a combination thereof.

The guidance instructions are to reach the verified location of occurrence of the actionable event. In an example, the guidance instructions are to reach an exit in the indoor facility nearest to the verified location of occurrence of the actionable event. The server device may provide the guidance instructions, using, for example, audio alerts, like a public announcement system.

The present subject matter provides an efficient and reliable technique for response management in indoor facilities. The present subject matter enables detection of the actionable event, such as a fire break out in some part of the indoor facility due to various reasons, say due to short circuiting of electrical appliances in the indoor facility or due to a flammable material stored in the indoor facility catching fire, an unauthorized person, such as a thief, trying to break into the indoor facility, and the like, by processing the signal received from the unmanned vehicle. Therefore, as soon as the server device processes the signal, it may be able to detect the occurrence of the actionable event. Further, the present subject matter triggers an alert to send to the event response system. Therefore, the event response system may enable taking appropriate action to address the emergency situation in a time bound manner without any delay. Accordingly, the present subject matter enables preventing any damage caused to the indoor facility, such as damages to the resources in the indoor facility and thereby preventing economic impact caused. The present subject matter also prevents further aggravation of the emergency situations. For instance, if a fire breaks out in one part of the warehouse, the present subject matter triggers an alert to the event response indicating occurrence of the fire breakout. Accordingly, the event response system may enable taking appropriate action, such as dousing fire using fire extinguishers. This prevents spreading of fire to the entire warehouse and prevents damage that may be caused to the goods. In some scenarios, this ensures safety of the personnel stuck in the portion of indoor facility due to the occurrence of the actionable event.

Unlike conventional systems, where indications, such as alarms provided to alert in the event of an emergency situations, may be missed by the emergency rescue teams due to location constraints, the present subject matter ensures that the alert are sent to the event response system and also provides guidance instructions to address the actionable events. Therefore, the present subject ensures that the indication of the actionable event is not missed. Further, the present subject matter verifies the occurrence of the actionable event based on the inputs from the set of static sensors disposed in the indoor facility. Accordingly, the present subject matter prevents any false alarm regarding the indication of the occurrence of the actionable event. On the other hand, with the present subject matter, the localization of the location of the actionable event is formed accurately. Therefore, the present subject matter enables the emergency rescue personnel to locate the incident easily. This may prevent the delay in taking the necessary action to address such actionable event that is caused due to localization of the location of the event in the indoor facility. By providing guidance instructions regarding the actionable event, the present subject matter enables safe evacuation of the people stuck in the indoor facility due to the occurrence of the actionable event. In some scenarios, the guidance instructions include instructions to reach an exit in the indoor facility nearest to the verified location of the occurrence of the actionable event. This may help in safe evacuation of the people stuck in the indoor facility in scenarios, where the emergency rescue teams are not available for evacuation and/or if it takes time for the emergency rescue teams to reach the location of the actionable event.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
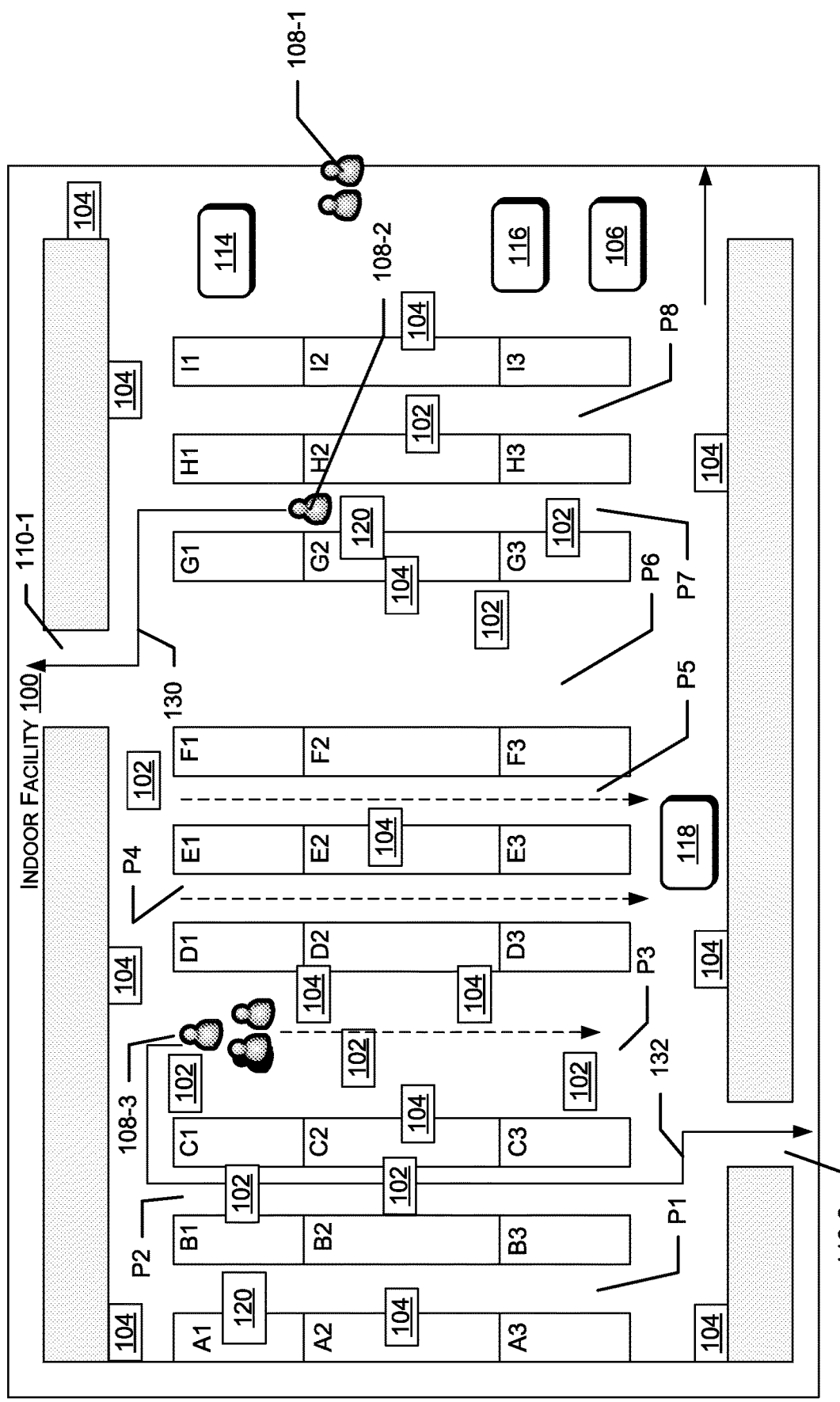
FIG. 1 illustrates an indoor facility, according to an example implementation of the present subject matter.

Indoor facilities may face emergency situations many times and, as part of indoor facility management, such situations may have to be addressed. For example, fire may break out in some part of the warehouse due to various reasons, say due to short circuiting of electrical appliances in the warehouse or due to a flammable material, stored in the warehouse, catching fire, an unauthorized person, such as a thief, may try to break into the warehouse to steal articles from the warehouse. Such incidents call for immediate attention and action to prevent any damage and also to prevent further aggravation of the situation. For instance, if a fire breaks out in some part of the warehouse, it may spread to the entire warehouse if it is not addressed immediately and may cause damage to the goods and/or may endanger the life of the personnel in the portion of incident inside the warehouse. Similarly, if an unauthorized person enters the warehouse and if it is not addressed, the person may steal many articles from the warehouse. Conventionally, to address such situations, in the indoor facilities, alarms, such as fire alarms and burglar alarms, are provided for alerting in the event of a fire break out or in the event of an unauthorized person trying to access the indoor facility respectively. This helps appropriate teams, such as an emergency rescue team, to take action accordingly.

However, owing to their nature and use, indoor facilities are, generally, large-sized spaces, typically ranging from multiple rooms on a single room to multiple floors with each floor having multiple rooms. Therefore, if the emergency rescue teams are at a location far from the location of the emergency incidents, sound from the alarm may not reach the emergency rescue teams. Therefore, appropriate rescue operations may not be carried out by them. Accordingly, significant economic loss may be incurred and/or human lives may be endangered. On the other hand, if the alarm is not localized to the location of the incident, then it may be difficult for the emergency rescue personnel to locate the incident in a time bound manner and address it.

In certain other circumstances, a worker in the indoor facility, such as a warehouse and/or industrial plant, may have an injury, for example, by falling in the indoor facility or due to a heavy article inventory or a storage rack falling on the worker. In some other instance, one or more paths in the indoor facility may be blocked due to falling of the racks or one or more storage rack, or a person may be stuck inside the indoor facility and may be unable to find the path towards the exit of the indoor facility. In conventional indoor facilities, to address these situations, various cameras may be positioned at different places in the indoor facilities to monitor such situations and provide assistance in rescue. However, it may be nearly impossible to address such incidents on time.

Moreover, in the conventional indoor facilities, it may be difficult to localize location of the incidents. For instance, it may not be easy to accurately determine the location of the incidents. Accordingly, the emergency rescue team may end up taking time to localize the exact location of the incidents. This may delay the necessary action to be taken to address such incidents. The delay in action may cause economic impact and endangers the indoor facility. For instance, the delay in locating the fire incidents may enable spreading of fire to adjacent parts in the indoor facility. Similarly, if there is a delay in addressing an injury caused to personnel in the indoor facility, it may aggravate the condition of the injury and in some cases, may endanger the lives of the personnel.

The present subject matter relates to response management in an indoor facility. With the present subject matter, location of emergency situations occurring in the indoor facility can be localized easily. Further, with the present subject matter, the emergency situations can be addressed in a time bound manner without any delay.

In accordance with the present subject matter, an unmanned vehicle that is movable in a space within the indoor facility may transmit a signal. The unmanned vehicle may, for example, include Unmanned Aerial Vehicle (UAV), an autonomous vehicle, such as an automated guided vehicle, an autonomous mobile robot, an autonomous fork truck, a robotic truck loader/unloader, a towing automatic guided vehicle, or a combination thereof. The signal that is transmitted may be for example, an audio signal or a visual signal. The unmanned vehicle may transmit the signal to a server device. In an example, the server device may be part of a local server device that is disposed within the indoor facility. In another example, the server device may be a cloud server device that is to receive the signal through a network.

The server device may detect if an actionable event has occurred. The actionable event may be, for example, a fire breakout in the indoor facility, an unauthorized person accessing the indoor facility, falling of one or more heavy goods from the rack in the indoor facility, a falling of a rack in the indoor facility, a distress call from a person in the indoor facility due to events, such as a fire breakout, blocking of a path in the indoor facility, accidents occurred to the personnel, like falling of a rack in the indoor facility on the personnel, and the like. In this regard, the server device may process the signal received from the unmanned vehicle to deduce occurrence of the actionable event.

In an aspect, the server device may deploy a processing model to process the received signal to deduce the occurrence of the actionable event. The processing model may be, for example, a machine learning-based model. In an example, if the received signal is an audio signal, the processing model may be an audio processing model. In another example, if the received signal is a visual signal, the processing model may be an image processing model.

In another example, the server device may determine that the actionable event has occurred based on comparison of the signal received from the unmanned vehicle with a threshold. For instance, if the received signal is an audio signal and if an amplitude of the received signal is greater than the amplitude threshold, the server device may deduce the occurrence of the actionable event.

Further, the server device may determine an accurate location of the actionable event. In this regard, the server device may determine a preliminary location of the occurrence of the actionable event from the signal received from the unmanned vehicle. In an example, the preliminary location may be determined based on an instantaneous position of the unmanned vehicle at a time of the transmission of the signal by the unmanned vehicle. The instantaneous location of the unmanned vehicle may be determined using localization beacon. The localization beacon may be, for example, a wireless fidelity (Wi-fi) beacon, Bluetooth beacon, an ultra-wide band (UWB), a Chirp Spread Spectrum (CSS) or any other type of localization beacon. A plurality of localization beacons may be disposed at various locations in the indoor facility.

Upon the determination of the preliminary location of the actionable event, a verified location of occurrence of the actionable event may be determined. In this regard, inputs from a set of static sensors disposed within the indoor facility may be used. Particularly, the inputs from the set of static sensors in proximity of the preliminary location of the occurrence of the actionable event may be used. The set of static sensors may be one or more static sensors that may be used. The set of static sensors may also be of one or more types. For instance, the set of static sensors may include one or more sound sensors, one or more imaging sensors, one or more Wi-fi beacons, one or more Bluetooth beacons, one or more UWBs, one or more CSS, or a combination thereof.

To determine the verified location of the static sensor, the server device may obtain inputs from the set of static sensors located in proximity of the preliminary location of the occurrence of the actionable event. The inputs from the static sensor may be obtained only when requested by the server device. In other words, the inputs from the static sensor may not be transmitted to the server device at all times but only during the time of request by the server device. The server device may process the inputs from the set of static sensors to verify the occurrence of the actionable event.

A processing model may be deployed to process inputs from the set of static sensors to verify the occurrence of the actionable event. The processing model may be a machine learning-based model. The processing model may be, for example, an audio processing model and/or an image processing model depending on the type of inputs. In an example, if the inputs are audio signals, the processing model may be an audio processing model. In another example, if the inputs are visual signals, the processing model may be an image processing model. If the inputs include both audio signals and visual signals, both audio processing model and the image processing model may be used.

The server device may determine the verified location of the occurrence of the critical actionable event in response to the verification of the occurrence of the actionable event. The verified location may be determined based on the preliminary location of the occurrence of the actionable event and an actual location of the set of static sensors within the indoor facility. In certain scenarios, inputs only from few of the set of sensors may be helpful in the verification of the occurrence of the actionable event while inputs from rest of the set of the sensors may not be helpful in the verification of the occurrence of the actionable event. In such scenarios, the server device may identify the relevant set of static sensors from the set of static sensors based on the inputs from the relevant set of static sensors being usable for verification of the occurrence of the actionable event. The server device may determine an actual location of a relevant set of static sensors from the set of static sensors. The verified location of occurrence of the actionable event may be determined based on the preliminary location of occurrence of the actionable event and the actual location of the relevant set of static sensors.

The server device may trigger an alert for sending to an event response system to indicate the occurrence of the actionable event. The alert may include verified location of occurrence of the event. The alert may be raised with stake holders, such as an emergency rescue team, to take an appropriate action.

In an example, the triggering may include prompting illumination of a selected light from amongst a plurality of lights disposed at a plurality of locations in the indoor facility. The selected light may be disposed in proximity to the verified location of the occurrence of the actionable event. In an example, the triggering may include prompting illumination of a set of lights that are disposed within a threshold distance from the verified location of the occurrence of the actionable event. Accordingly, the selected light(s) may be turned on. The prompting may be done through a light controller that is operably coupled with and that controls the plurality of lights.

In some circumstances, the present subject matter provides guidance during the occurrence of the actionable event. The server device may provide guidance instructions regarding the actionable event based on the determined verified location of the occurrence of the actionable event and a route map of the indoor facility. The guidance instructions may be provided to an emergency rescue team, people stuck inside the indoor facility due to the occurrence of the actionable event, or a combination thereof.

The guidance instructions are to reach the verified location of occurrence of the actionable event. In an example, the guidance instructions are to reach an exit in the indoor facility nearest to the verified location of occurrence of the actionable event. The server device may provide the guidance instructions, using, for example, audio alerts, like a public announcement system.

The present subject matter provides an efficient and reliable technique for response management in indoor facilities. The present subject matter enables detection of the actionable event, such as a fire break out in some part of the indoor facility due to various reasons, say due to short circuiting of electrical appliances in the indoor facility or due to a flammable material, stored in the indoor facility, catching fire, an unauthorized person, such as a thief, trying to break into the indoor facility, and the like, by processing the signal received from the unmanned vehicle. Therefore, as soon as the server device processes the signal, it may be able to detect the occurrence of the actionable event. Further, the present subject matter triggers an alert to send to the event response system. Therefore, the event response system may enable taking appropriate action to address the emergency situation in a time bound manner without any delay. Accordingly, the present subject matter enables preventing any damage caused to the indoor facility, such as damages to the resources in the indoor facility and thereby preventing economic impact caused. The present subject matter also prevents further aggravation of the emergency situations. For instance, if a fire breaks out in one part of the warehouse, the present subject matter triggers an alert to the event response indicating occurrence of the fire breakout. Accordingly, the event response system may enable taking appropriate action, such as dousing fire using fire extinguishers. This prevents spreading of fire to the entire warehouse and prevents damage that may be caused to the goods. In some scenarios, this ensures safety of the personnel stuck in the portion of indoor facility due to the occurrence of the actionable event.

Unlike conventional systems, where indications, such as alarms provided to alert in the event of an emergency situations, may be missed by the emergency rescue teams due to location constraints, the present subject matter ensures that the alert are sent to the event response system and also provides guidance instructions to address the actionable events. Therefore, the present subject ensures that the indication of the actionable event is not missed. Further, the present subject matter verifies the occurrence of the actionable event based on the inputs from the set of static sensors disposed in the indoor facility. Accordingly, the present subject matter prevents any false alarm regarding the indication of the occurrence of the actionable event. On the other hand, with the present subject matter, the localization of the location of the actionable event is formed accurately. Therefore, the present subject matter enables the emergency rescue personnel to locate the incident easily. This may prevent the delay in taking the necessary action to address such actionable event that is caused due to localization of the location of the event in the indoor facility. By providing guidance instructions regarding the actionable event, the present subject matter enables safe evacuation of the people stuck in the indoor facility due to the occurrence of the actionable event. In some scenarios, the guidance instructions include instructions to reach an exit in the indoor facility nearest to the verified location of the occurrence of the actionable event. This may help in safe evacuation of the people stuck in the indoor facility in scenarios, where the emergency rescue teams are not available for evacuation and/or if it takes time for the emergency rescue teams to reach the location of the actionable event.

The present subject matter is further described with reference to FIGS. 1-9. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates an indoor facility 100, according to an example implementation of the present subject matter. The indoor facility 100 may be, for example, a warehouse, an industrial plant, a hospital unit, an indoor recreational facility, a building, like a gated-community building, a multistoried building, and the like. Hereinafter, the indoor facility 100 may be explained with reference to the warehouse. The size of the warehouse 100 may be varying from a single room to multiple rooms on a single floor to multiple floors with each floor having multiple rooms. In the example depicted herein, the warehouse 100 is depicted to show a single room. The warehouse 100 may include a plurality of storage racks A1-I3 to store one or more items (not shown in FIG. 1), such as raw materials, finished products, packed materials, and the like. Each of the storage rack A1-I3 may include same or different types of items. For instance, the storage rack A1-A3 may store books, the storage racks B1-B3 may store inflammable chemicals, and so on.

One set of storage racks A1-I3 may be displaced at a distance from another set of storage racks A1-I3 to act a pathway for the personnel in the warehouse 100 and to provide access to the items stored in the storage racks A1-I3. For instance, a pathway P1 may be between the racks A1-A3 and B1-B3. Similarly, a pathway P2 may be between the racks B1-B3 and C1-C3. Likewise, the warehouse 100 may include a plurality of pathways P1-P8.

The warehouse 100 may include an unmanned vehicle 102 that does not require an onboard operator or driver. The unmanned vehicle 102 may be used for various purposes, such as enabling determination of an actionable event, transporting the items within the warehouse 100 and/or outside the warehouse 100, lifting the items, loading and/or unloading the items in the storage racks A1-I3, and the like. The unmanned vehicle 102 may, for example, include Unmanned Aerial Vehicle (UAV), an autonomous vehicle, such as an automated guided vehicle, an autonomous mobile robot, an autonomous fork truck, a robotic truck loader/unloader, a towing automatic guided vehicle, or a combination thereof. Hereinafter, the unmanned vehicle 102 will be explained with reference to UAV.

In addition, the warehouse 100 may include a set of static sensors 104 to identify a plurality of parameters corresponding to the warehouse, such as sound level, movement of the personnel in the warehouse, and so on. Accordingly, the set of static sensors 104 may be disposed at various locations within the warehouse 100, such as to walls, ceilings, to the storage racks A1-C3, and the like. In an example, the set of static sensors 104 may be sound sensors, such as sound level sensors. In another example, the set of static sensors 104 may be imaging sensors, such as image capturing devices. The imaging sensors may be, for example, a still camera, a video camera, an Infra-red camera, a depth sensor, a time-of-flight camera, a stereo camera, or a combination thereof. In some examples, the set of static sensors 104 may be, for example, a Bluetooth beacon, a Wireless Fidelity (Wi-fi) beacon, an ultra-wide band (UWB) beacon, a Chirp Spread Spectrum (CSS) beacon, and a Near Field Communication (NFC) sensor. The set of static sensors 104 may also include a proximity sensor, touch sensor, depth sensor, ultrasonic range sensors, Light detection and Ranging (LID) device, or a combination thereof. The set of static sensors 104 may enable verification of the occurrence of an actionable event, as will be described with reference to FIGS. 5,6, and 7.

The warehouse 100 may include a warehouse management system (WMS) 106 to facilitate distribution of the items from the warehouse 100. The WMS 106 may perform various operations, including, inventory management, streamlining the process related to picking and packaging the orders, management of personnel in the warehouse, including assigning different tasks for different person in the warehouse, scheduling of the work plan for the personnel in the warehouse. For instance, the WMS 106 may employ continuous real-time location information in assigning tasks for packaging and unmanned vehicle to expedite movement of products to accelerate distribution. In an example, in addition, the WMS 106 may also include invoicing and accounting. The WMS 106 may be a computing device that has processing capabilities, such as a server, a desktop, a laptop, a tablet, a mobile phone, or the like. The WMS 106 may include, for example, a microprocessor, a microcomputer, a microcontroller, a digital signal processor, a central processing unit, a state machine, a logic circuitry, or a device that manipulates signals based on operational instructions. Among other capabilities, the processing unit may fetch and execute computer-readable instructions stored in a memory (not shown in FIG. 1), such as a volatile memory or a non-volatile memory, of the warehouse management system. In an example, the WMS 106 may be disposed within the warehouse 100. In another example, the WMS 106 may be cloud-based that has a remote server connected through a network. The WMS 106 may be operably connected to the set of static sensors 104.

The warehouse 100 may include a plurality of personnel 108-1, 108-2, 108-3 at different locations within the warehouse 100. For instance, one or more workers may be loading and/or unloading items from the storage racks A1-I3, one or more workers deployed for packaging items for the distribution, personnel deployed to oversee the working of personnel the warehouse, personnel being part of an emergency rescue team to address emergency situations occurring in the warehouse, and the like.

Different actionable events may occur in the warehouse 100. The actionable events may be emergency situations occurring in the warehouse 100. The actionable event may be, for example, a fire breakout in the warehouse 100, an unauthorized person accessing the warehouse 100, falling of one or more heavy goods from the storage racks A1-I3 in the warehouse, a falling of a storage rack A1-I3 in the warehouse 100, a distress call from a person in the warehouse 100 due to events, such as a fire breakout, blocking of a path in the warehouse 100, accidents occurred to the personnel, like falling of a storage rack A1-I3 on the personnel, and the like. For instance, assume that a fire has broken out in the pathway P3 between the set of storage racks C1-C3 and set of storage racks D1-D3. Due to that, personnel 108-3 in the pathway P3 may be stuck and may need help to safely evacuate them. Similarly, in another instance, an inflammable chemical may have fallen off the storage rack G2, due to which, a person 108-2 may be stuck in the pathway P7. Accordingly, the person 108-2 may have to be safely evacuated to, for example, a nearest exit 110-2 in the warehouse, an entry in the warehouse 100, and the like. Accordingly, to address such actionable events, the warehouse 100 may include a server device 114. In other words, the server device 114 may facilitate determination of actionable event, as will be described in detail with reference to FIGS. 3, 5, 6, and 7.

In an example, the server device 114 may be disposed within the warehouse 100. In another example, the WMS 106 may be cloud-based connected through a network (not shown in FIG. 1).

The warehouse 100 may include an event response system 116 to facilitate addressing the actionable events. For instance, the event response system 116 may alert appropriate teams, such as an emergency rescue team, to safely evacuate the people stuck in the warehouse 100 due to the occurrence of the actionable event. In another example, the event response system 116 may also instruct one or more equipment, say a fire extinguisher, disposed at a location of the occurrence of the warehouse 100, to address the actionable event, such as extinguish the fire by operation thereof. Although in the examples depicted herein, the event response system 116 is explained to be different from the server device 114. In some examples, the event response system 116 may be a part of the server device 114. In other words, the functionalities performed by the event response system 116 may be performed by the server device 114.

The warehouse 100 may include a light controller 118 to control a plurality of lights 120 disposed at various locations in the warehouse 120. The lights 120 may be disposed in the wall, in the ceiling, in the storage racks, or a combination thereof. The light controller 118 may be a microprocessor, a microcomputer, a microcontroller, a digital signal processor, a central processing unit, a state machine, a logic circuitry, or a device that manipulates signals based on operational instructions. Among other capabilities, the processing unit may fetch and execute computer-readable instructions stored in a memory, such as a volatile memory or a non-volatile memory, of the server device. The warehouse 100 may include the network, through which various components of the warehouse, such as the server device 114, the WMS 106, the event response system 116, the set of static sensors 104, the light controller 118, and the like may be communicating with each other within the warehouse 100 and also outside the warehouse 100. The network may, for example, include wireless networks, wireless Local Area Network (WLAN), RAN, satellite-based network, and the like.

Figure 2:
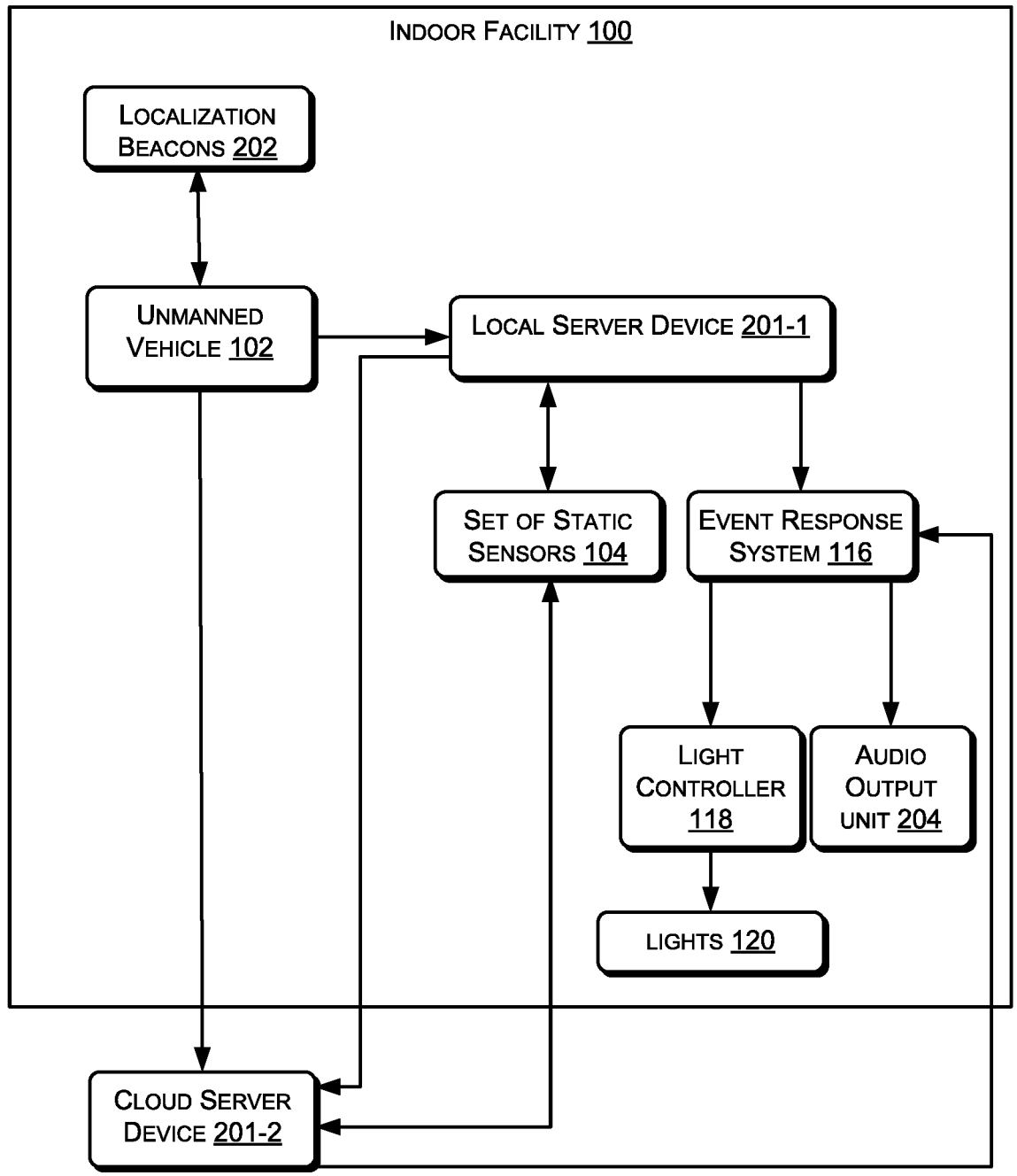
FIG. 2 illustrates a block diagram of an indoor facility, according to an example implementation of the present subject matter.

FIG. 2 illustrates a block diagram of the indoor facility 100, according to an example implementation of the present subject matter. The warehouse 100 may include a server device 201-1 disposed within the warehouse 100. The server device 201-1 disposed within the warehouse 100 may be hereinafter referred to as the local server device 201-1. The local server device 201-1 may correspond to the server device 114. To enable detection of the occurrence of the actionable event, the local server device 201-1 may be operably connected to the unmanned vehicle 102. Hereinafter, the unmanned vehicle 102 will be explained with reference to the UAV. As the UAV 102 moves within the space inside the warehouse 100, the UAV 102 may collect variety of signals. For instance, the UAV 102 may collect audio signals, visual signals, or a combination thereof.

In an example, the local server device 201-1 may have to determine a preliminary location of the occurrence of the actionable event. To determine the preliminary location, the local server device 201-1 may have to identify an instantaneous position of the UAV 102. Accordingly, the UAV 102 may utilize a plurality of localization beacons 202 disposed at different locations in the warehouse 100. In other words, the UAV 102 may determine the instantaneous position using the plurality of localization beacons 202 and may transmit the instantaneous position to the local server device 201-1. The localization beacons 202 may be, for example, a Bluetooth beacon, a Wi-fi beacon, a UWB beacon, a CSS beacon, an NFC sensor, a proximity sensor, an ultrasonic range sensor, a Light detection and Ranging (LIDAR) sensor, or a combination thereof.

In response to the detection of the occurrence of the actionable event, the local server device 201-1 may verify the occurrence of the actionable event and determine a verified location of the actionable event using the set of static sensors 104. The local server device 201-1 may obtain inputs from the set of static sensors 104 to verify the occurrence of the actionable event. In this regard, each of the set of static sensors 104 may be in electronic communication with the local server device 201-1.

The set of static sensors 104 may transmit the inputs to the local server device 201-1 for further processing in response to a request from the server device 201-1. In other words, the set of static sensors 104 may not transmit the inputs to the local server device 201-1 at all times, instead transmits only when the request is made from the local server device 201-1. Therefore, the present subject matter enables efficient use of storage space of the server device 201-1.

In addition to address the actionable events, the local server device 201-1 may be in electronic communication with the event response system 116. Upon receiving an alert from the local server device regarding the occurrence of the actionable event, the event response system 116 may alert a team, such as an emergency rescue team, to address the actionable event. For instance, if people are stuck in the warehouse 100 due to break out of fire at some portion of the warehouse 100, the event response system 116 may send a signal to the light controller 118 to actuate the one or more lights 120 at the location proximate to the verified location of the actionable event. In particular, the signal may be to actuate the lights 120 in a predetermined pattern. This may enable identification of location of the actionable event occurrence for the emergency rescue team. In an example, the event response system 116 may alert a team, such as an administration team that is to, for example, monitor administration related activities in the warehouse 100. In another example, the event response system 116 may optionally or additionally activate an alarm, fire alarms and burglar alarms, disposed proximate to the verified location of the occurrence of the actionable events to actuate. The activation of the alarm may serve as the alert to the teams, such the emergency rescue team, the administration team, or as an alert to people near the verified location of the actionable event occurrence.

In some scenarios, the event response system 116 may guide the people stuck in the warehouse to take an appropriate path, such as a safe path to follow to reach the entry/exit of the warehouse, a safe path to reach the nearest exit 110-1, 110-2 (not shown in FIG. 2) of the warehouse 100, a path that should be avoided due to occurrence of the critical event, a safe place to reach in the warehouse 100, and/or appropriate route to be taken to reach the emergency rescue team. In an example, the event response system 116 may provide the guidance instructions regarding the appropriate path by sending instructions to the light controller 118 to control the lights 120 disposed along the appropriate path in the predetermined pattern. In another example, the event response system 116 may send guidance instructions to an audio output unit 204. The audio output unit 204 may be, for example, a speaker disposed in the warehouse 100. In other examples, there may be a plurality of signboards (not shown in FIG. 2), such as digital signboards, that may be instructed by the event response system 116 to indicate the appropriate path. In an example, instead of providing guidance to the people stuck at the location of the occurrence of the critical event, the event response system 116 may provide guidance to the emergency rescue team to reach the location of the occurrence of the actionable event to safely evacuate the people stuck.

In some examples, the event response system 116 may determine the appropriate path and determine the guidance instructions to be provided. In another example, the local server device 201-1 while triggering the alert may send the appropriate path and the guidance instructions to the event response system 116.

In some examples, the event response system 116 may instruct one or more equipment (not shown in FIG. 2) disposed at the location of the occurrence of the actionable event to address the actionable event. For instance, the event response system 116 may instruct one or more fire extinguishers (not shown in FIG. 2) disposed proximate to the verified location of the occurrence of the actionable events to actuate, thereby, dousing fire. such as extinguish the fire by operation thereof. In some examples, the event response system 116 may instruct an indoor facility planning unit to change a plan corresponding to an operation of the indoor facility. The indoor facility planning unit may be, for example, the WMS 106. Accordingly, in an example, the event response system 116 may instruct the WMS 106 to change the work plan of a worker who is supposed to work at the verified location of the occurrence of the actionable event to work at a different location and/or change the work timings of the workers that are supposed to work at the location of the occurrence of the actionable event.

In the above examples, to enable faster detection of the occurrence of the actionable event and addressing the actionable events, the local server device 201-1 is explained to perform the detection of the occurrence of the actionable event, verification of the occurrence of the actionable event, and determine of a preliminary location and a verified location of the actionable event. In such examples, the inputs received by the local server device 201-1 may also be optionally received by a cloud server device 201-2 for storage purposes. The cloud server device 201-2 may correspond to the server device 114.

Alternatively, in an example, the cloud server device 201-2 may perform the detection of the occurrence of the actionable event, verification of the occurrence of the actionable event, and determine a preliminary location and a verified location of the actionable event. In this regard, the local server device 201-1 may receive the appropriate inputs from the set of static sensors 104 and the unmanned vehicle 102. The local server device 201-1 may transmit the information to the cloud server device 201-2 for further processing. In some examples, the cloud server device 201-2 may directly receive information from the unmanned vehicle 102 and from the set of static sensors 104. Further, in such scenarios, the cloud server device 201-2 may directly trigger an alert to the event response system 116. In some scenarios, the cloud server device 201-2 may trigger the alert to the event response system 116 through the local server device 201-1.

In another example, the local server device 201-1 may perform some of the functions and the cloud server 201-2 may perform other functions. For instance, the local server device 201-1 may perform the detection of the occurrence of the actionable event, verification of occurrence of the actionable event, and determination of the preliminary location of the occurrence of the actionable event. The global server device 201-2 may determine a verified location of the actionable event and may trigger an alert to the event response system 116. In another example, the local server device 201-1 may only perform the detection of the occurrence of the actionable event, while the global server device 201-2 may determine the preliminary location, determine the verified location of the actionable event, and may trigger the alert to the event response system 116.

Furthermore, in an example, the local server 201-1 or the cloud server device 201-2 may perform the actions based on specific scenarios. For instance, in scenarios, such as activating the alarm regarding the occurrence of the actionable event, providing guidance to the people stuck in the warehouse 100 to take the appropriate path, for example, the nearest exit 110-1, 110-2 in the warehouse 100, and the like, the local server device 201-1 may perform the action of triggering the alert to the event response system 116. In scenarios, such as generating insight about crowd density at various locations in the warehouse 100, generating the safe path to follow to reach the entry/exit of the warehouse, the safe path to reach the nearest exit 110-1, 110-2 in the warehouse 100, and the like, the cloud server device 201-2 may perform the action of triggering the alert to the event response system 116.

Figure 3:
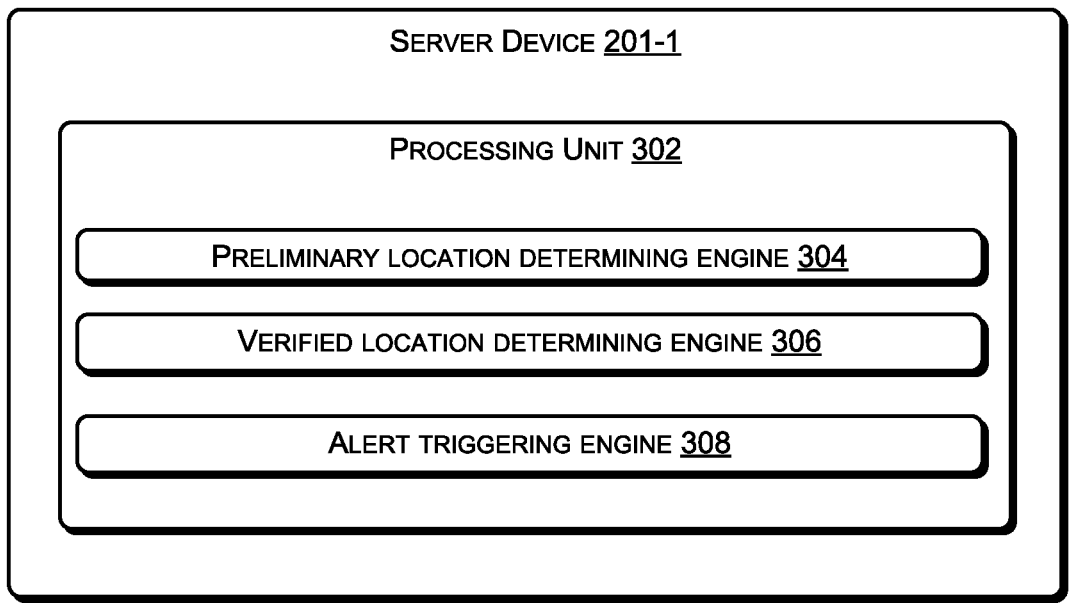
FIG. 3 illustrates a server device, according to an example implementation of the present subject matter.

FIG. 3 illustrates the server device 201-1, according to an example implementation of the present subject matter. In the depicted example, the server device is explained with reference to the local server device 201-1. However, as will be understood, the components and the functionalities of the local server device 201-1 explained herein may be applicable to the cloud server device 201-2.

The server device 201-1 can include a processing unit 302 to run at least one operating system and other applications and services. The server device can also include an interface (not shown in FIG. 3) and a memory (not shown in FIG. 3). Further, the server device 201-1 can include one or more engine and data.

The processing unit 302, amongst other capabilities, may be configured to fetch and execute computer-readable instructions stored in the memory. The processing unit 302 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processing unit", may be provided through the use of dedicated hardware as well as hardware capable of executing machine readable instructions.

When provided by the processing unit 302, the functions may be provided by a single dedicated processor, by a single shared processor, or by a plurality of individual processors, some of which may be shared. Moreover, explicit use of the term "processing unit" should not be construed to refer exclusively to hardware capable of executing machine readable instructions, and may implicitly include, without limitation, digital signal processor (DSP) hardware, network processor, application specific integrated circuit (ASIC), field programmable gate array (FPGA), read only memory (ROM) for storing machine readable instructions, random access memory (RAM), non-volatile storage. Other hardware, conventional and/or custom, may also be included.

The interface may include a variety of machine-readable instructions-based interfaces and hardware interfaces that allow the server device to interact with different entities, such as the processing unit 302, the engines 304, 306, 308, and the data (not shown in FIG. 3). Further, the interface may enable the components of the server device 201-1 to communicate with computing devices, web servers, and external repositories. The interface may facilitate multiple communications within a wide variety of networks and protocol types, including wireless networks, wireless Local Area Network (WLAN), RAN, satellite-based network, and the like.

The memory may be coupled to the processing unit and may, among other capabilities, provide data and instructions for generating different requests. The memory can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

The engines 304, 306, 308 may include routines, programs, objects, components, data structures, and the like, which perform particular tasks or implement particular abstract data types. The engines 304, 306, 308 may further include modules that supplement applications on the server device 201-1, for example, modules of an operating system. Further, the engines 304, 306, 308 may be implemented in hardware, instructions executed by a processing unit, or by a combination thereof.

In an implementation, the engines 304, 306, 308 may be machine-readable instructions which, when executed by the processing unit 302, perform any of the described functionalities. The machine-readable instructions may be stored on an electronic memory device, hard disk, optical disk or other machine-readable storage medium or non-transitory medium. In one implementation, the machine-readable instructions can also be downloaded to the storage medium via a network connection.

The engines 304, 306, 308 may perform different functionalities. The engines 304-, 306, 308 include a preliminary location determining engine 304, a verified location determining engine 306, and an alert triggering engine 308. The functions of the engines 304, 306, 308 are explained below.

In operation, the preliminary location determining engine 304 may receive a signal from the UAV 102 (not shown in FIG. 3) and may process the signal to deduce the occurrence of the actionable event. To process the signal, the preliminary location determining engine 304 may use an audio processing model, an image processing model, or a combination thereof. In an example, the preliminary location determining engine 304 may compare an amplitude of a signal with an amplitude threshold as will be discussed in detail with reference to FIG. 5. In this regard, in an example, the server device 201-1 may store the audio processing model, the image processing model, the amplitude threshold in the memory of the server device 201-1. In some examples, the server device 201-1 may also receive the audio processing model, the image processing model, the amplitude threshold from components, such as the UAV 102, the cloud server device 201-2, and the like, for the processing.

The preliminary location determining engine 304 may determine a preliminary location of the occurrence of the actionable event from the signal. The preliminary location may be, for example, an approximate location of the occurrence of the actionable event. The determination of the preliminary location may be based on an instantaneous position of the UAV 102 at the time of transmission of the signal by the UAV 102. The UAV 102 may transmit, to the preliminary location determination engine 304, the instantaneous position along with a corresponding time instance at various time instances. For instance, assume that the location of the unmanned vehicle is proximate the storage rack C2 (not shown in FIG. 3). During the movement of the UAV 102 near the storage rack C2, the UAV 102 transmits a signal based on which the occurrence of the actionable event is deduced by the server device 201-1. In this regard, the preliminary location determining engine 304 may correspond a time instance at which the signal was received from the UAV 102 and identify the instantaneous position of the UAV 102 at that time instance. Accordingly, the preliminary location determining engine 304 may determine that the preliminary location of the occurrence of the actionable event may be at a first distance from the storage rack C2.

In an example, to prevent false indications of the occurrence of the actionable events, the occurrence of the actionable event have to be verified. Accordingly, the verified location determining engine 306 may obtain inputs from a set of static sensors located in proximity of the preliminary location of the occurrence of the actionable event. The verified location determining engine 306 may send a request to the set of static sensors 104 disposed in proximity to the preliminary location of the occurrence of the actionable event. The verified location determining engine 306 may process the obtained inputs from the set of static sensors 104 to verify the occurrence of the actionable event. The set of static sensors 104 may be, for example, at least one sound sensor in proximity of the preliminary location, at least one imaging sensor in proximity of the preliminary location, or a combination thereof. If the static sensor 104 is a sound sensor, the verified location determining engine 306 may deploy an audio processing model to verify the occurrence of the actionable event. If the static sensor 104 is an imaging sensor, the verified location determining engine may deploy an image processing model to verify the occurrence of the actionable event.

In response to the verification of the occurrence of the actionable event, the verified location determining engine 306 may determine a verified location of the occurrence of the actionable event. The verified location may be determined based on the preliminary location of the occurrence of the actionable event and an actual location of the set of static sensors 104.

Upon the determination of the verified location of the occurrence of the actionable event, the server device 201-1 may have to enable addressing the actionable event. In this regard, the alert triggering engine 308 may trigger an alert for sending to the event response system 116 (not shown in FIG. 3) to indicate occurrence of the actionable event. The alert may include the verified location of the occurrence of the event. In some examples, the alert may also include provision of the guidance instructions regarding the actionable event based on the determined verified location of the occurrence of the actionable event and a route map of the warehouse. The guidance instructions may be to reach the verified location of the occurrence of the actionable event, reach an exit in the warehouse nearest to the verified location, and the like. In an example, to enable providing the guidance instructions, the server device 201-1 may include a route map (not shown in FIG. 3) of the warehouse 100. The route map may include various entry and exit in the warehouse 100, various pathways in the warehouse 100, and the like. The route map may be stored in the memory of the server device 201-1. In an example, to determine the path to reach verified location of the occurrence of the actionable event, reach an exit 110-1, 110-2 (shown in FIG. 1) in the warehouse 100 nearest to the verified location, a safe path 130, 132 (shown in FIG. 1) to follow to reach the entry/exit of the warehouse 100, a safe path 130, 132 to reach the nearest exit of the warehouse 100, a path P7 (shown in FIG.

1) that should be avoided due to occurrence of the critical event, a safe place to reach in the warehouse 100, and/or appropriate route to be taken to reach the emergency rescue team, the server device 201-1 may utilize the route map.

Figure 4:
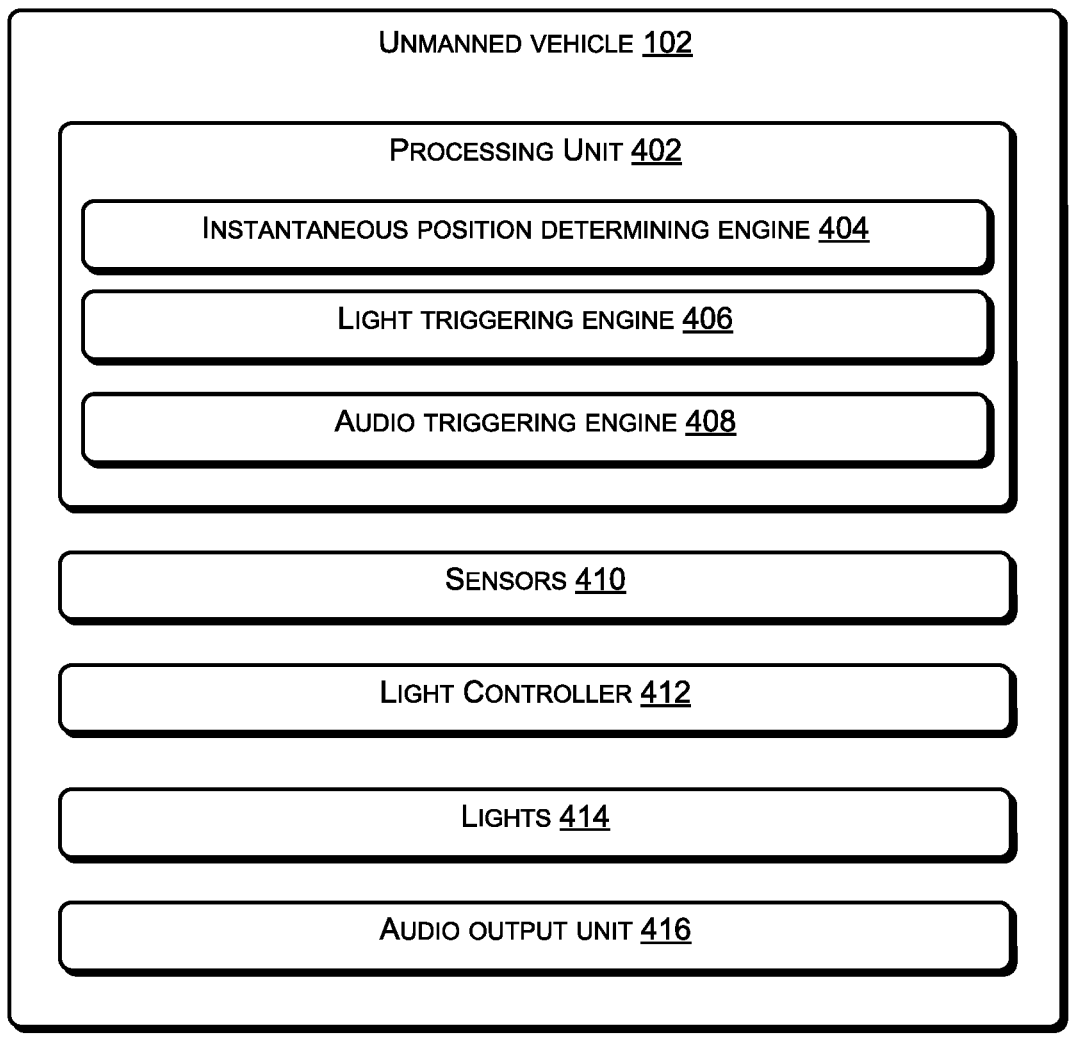
FIG. 4 illustrates an unmanned vehicle, according to an example implementation of the present subject matter.

FIG. 4 illustrates an unmanned vehicle 102, according to an example implementation of the present subject matter. The UAV 102 can include a processing unit 402 to run at least one operating system and other applications and services. The server device can also include an interface (not shown in FIG. 4) and a memory (not shown in FIG. 4). Further, the UAV 102 can include one or more engines and data.

The processing unit 402, amongst other capabilities, may be configured to fetch and execute computer-readable instructions stored in the memory. The processing unit 402 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processing unit", may be provided through the use of dedicated hardware as well as hardware capable of executing machine readable instructions.

When provided by a processing unit 402, the functions may be provided by a single dedicated processor, by a single shared processor, or by a plurality of individual processors, some of which may be shared. Moreover, explicit use of the term "processing unit" should not be construed to refer exclusively to hardware capable of executing machine readable instructions, and may implicitly include, without limitation, digital signal processor (DSP) hardware, network processor, application specific integrated circuit (ASIC), field programmable gate array (FPGA), read only memory (ROM) for storing machine readable instructions, random access memory (RAM), non-volatile storage. Other hardware, conventional and/or custom, may also be included.

The interface may include a variety of machine-readable instructions-based interfaces and hardware interfaces that allow the server device to interact with different entities, such as the processing unit 402, the engines 404, 406, 408, and the data. Further, the interface may enable the components of the UAV 102 to communicate with computing devices, web servers, and external repositories. The interface may facilitate multiple communications within a wide variety of networks and protocol types, including wireless networks, wireless Local Area Network (WLAN), RAN, satellite-based network, and the like.

The memory may be coupled to the processing unit and may, among other capabilities, provide data and instructions for generating different requests. The memory can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

The engines 404, 406, 408 may include routines, programs, objects, components, data structures, and the like, which perform particular tasks or implement particular abstract data types. The engines 404, 406, 408 may further include modules that supplement applications on the server device, for example, modules of an operating system. Further, the engines may be implemented in hardware, instructions executed by a processing unit, or by a combination thereof.

In an implementation, the engines 404, 406, 408 may be machine-readable instructions which, when executed by the processor, perform any of the described functionalities. The machine-readable instructions may be stored on an electronic memory device, hard disk, optical disk or other machine-readable storage medium or non-transitory medium. In one implementation, the machine-readable instructions can also be downloaded to the storage medium via a network connection.

The engines 404, 406, 408 may perform different functionalities. The engines 404, 406 408 include an instantaneous position determining engine 404, a light triggering engine 406, and an audio triggering engine 408. The functions of the engines 404, 406,408 are determined are explained in later paragraphs.

In addition, the UAV 102 may include a plurality of sensors 410 to capture variety of parameters to enable facilitation of the detection of the occurrence of the actionable event. The plurality of sensors 410 may include sound sensors, like, a sound level sensor. In an example, the sensors 410 may include imaging sensors, such as a still camera, a video camera, an Infra-red camera, a depth sensor, a time-of-flight camera, a stereo camera, or a combination thereof. The UAV 102 may include a light controller 412 to control one or more lights 414 of the UAV 102. The provision of the one or more lights 414 may enable providing guidance regarding the occurrence of the actionable event.

In operation, the UAV 102 may transmit signals that enable determination of the occurrence of the actionable event. The signals may be, for example, audio signal, visual signals, or a combination thereof. Accordingly, the UAV 102 may acquire the signals using an appropriate sensor. For instance, the UAV 102 may acquire audio signal using from a sound sensor. The UAV 102 may acquire visual signal from a still camera, a video camera, an infra-red camera, a depth sensor, a time-of-flight sensor, a stereo camera, or a combination thereof. In some examples, the UAV 102 may transmit combination of an audio signal and a visual signal.

The instantaneous position determining engine 404 may enable determination of the preliminary location of the occurrence of the actionable event. In this regard, the UAV 102 may utilize the plurality of localization beacons 202 positioned at various locations in the warehouse. The localization beacons 202 may broadcast signals on regular intervals. The corresponding beacon-technology receiver in the UAV 102 may receive the signal from the beacon 202 and process the signal. Based on the location of the localization beacon 202, which is already known, the instantaneous position of the UAV 102 may be determined. For instance, assume that there a plurality of Bluetooth beacons disposed at various locations in the warehouse 100 with position of each Bluetooth beacon being already known to the UAV 102. Further, assume that UAV 102 includes Bluetooth receiver. In this regard, when the UAV 102 passes through one of the Bluetooth beacons, the UAV 102 may receive the signals broadcast by the Bluetooth beacon at that location. The UAV 102 may determine that the instantaneous position of the UAV 102 based on the location of the Bluetooth beacon from which the signal was received by the UAV 102. In this regard, the UAV 102 may store locations of each of the plurality of localization beacons 202. In an example, instead of determining the location, the UAV 102 may transmit an identifier corresponding to the localization beacon 202 to the server device 201-1 (not shown in FIG. 4). The Server device 201-1 may determine the location of the localization beacon 202 corresponding to the identifier received from the UAV 102 and the server device 201-1 may determine the instantaneous position of the UAV 102.

The light triggering engine 406 may enable instructing the light controller 412 to enable switching on of the lights 414 to provide guidance instructions regarding the actionable event, as will be discussed with reference to FIG. 7. In some examples, the UAV 102 may include an audio triggering engine 408. The audio triggering engine 408 may enable providing guidance instructions through an audio output unit 416 of the UAV 102, such as a speaker.

Although not depicted in FIG. 4, the UAV 102 may include one or more of a preliminary location determining engine, a verified location determining engine, and an alert triggering engine, similar to the corresponding engines, 304, 306, and 308, of the server device 201-1, as explained with reference to FIG. 3. The functionalities of such engines of the UAV 102 may also be similar to the corresponding engines 304, 306, 308 of the server device 201-1. For instance, the preliminary location determining engine may determine the preliminary location of the occurrence of the actionable event based on the signal acquired by the UAV 102. The verified location determining engine may verify the occurrence of the actionable event and determine the verified location of the occurrence of the actionable event from the set of static sensors 104. The alert triggering engine may trigger an alert to the event response system 116 (not shown in FIG. 4) regarding the occurrence of the actionable event and the verified location of the occurrence of the actionable event.

Figure 5:
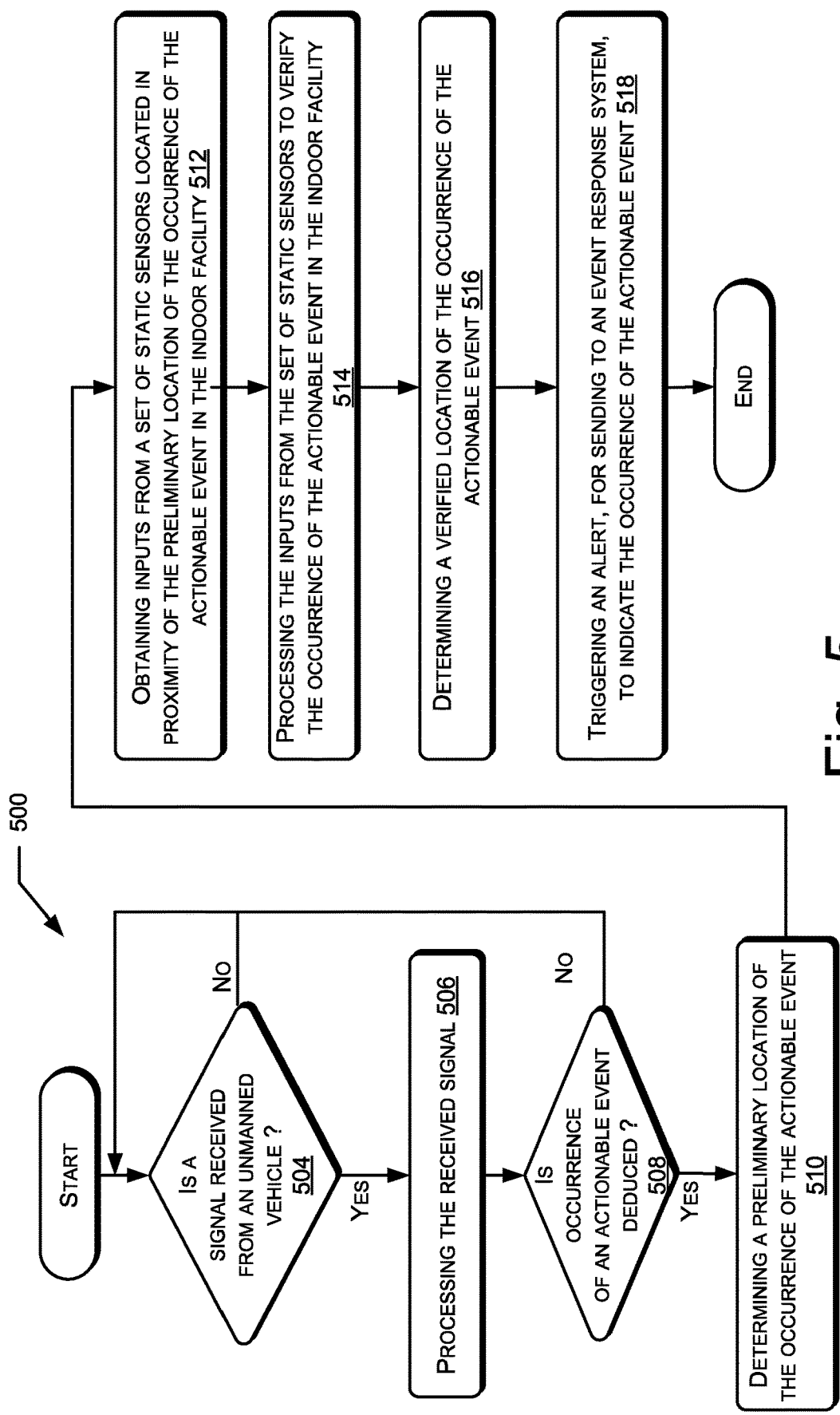
FIG. 5 illustrates a method for response management in an indoor facility, according to an example implementation of the present subject matter.

FIG. 5 illustrates a method 500 for response management in an indoor facility, according to an example implementation of the present subject matter. The order in which the method 500 is described is not intended to be construed as a limitation, and any number of the described method blocks may be combined in any order to implement the method 500, or an alternative method. Furthermore, the method 500 may be implemented by processor(s) or computing device(s) through any suitable hardware, non-transitory machine-readable instructions, or a combination thereof.

It may be understood that steps of the method 500 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 500 may be performed by the server device 201-1 or the server device 201-2. The indoor facility may correspond to the warehouse 100.

At step 504, the server device may determine if a signal is received from an unmanned vehicle. The unmanned vehicle may correspond to the unmanned vehicle 102. Hereinafter, the unmanned vehicle may be explained with reference to the UAV. The signal may be, for example, audio signal, a visual signal, or a combination thereof. At step 504, if it is determined that the signal is not received from the UAV, the server device may repeat the step 504.

If it is determined that the signal is received from the UAV, the received signal may be processed by the server device, at step 506. In an example, in some scenarios, such as falling of a storage rack, falling of a heavy item from the storage rack, breaking of an item, falling of an item on a person, and the like, the processing may be performed based on an amplitude threshold. For instance, the server device, upon receiving the audio signal from the UAV, may compare an amplitude of the received signal with an amplitude threshold for the processing. In an example, in scenarios, such as a distress call from a person in the warehouse due to events, such as a fire breakout, blocking of a path in the warehouse, accidents occurred to the personnel, like falling of a rack in the warehouse on the personnel, falling of a storage rack, falling of a heavy item from the storage rack, breaking of an item, falling of an item on a person, and the like, the server device may deploy a processing model for the processing. For instance, if the signal received from the UAV is an audio signal, the server device may deploy an audio processing model. If the signal received from the UAV is a visual signal, the server device may deploy an image processing model.

At step 508, the server device may deduce if the actionable event has occurred, based on the processing of the received signal. For instance, in scenarios where the processing is performed by comparing the amplitude of the received signal with the amplitude threshold for the processing, the server device may deduce that an actionable event has occurred if the amplitude of the received signal is greater than the amplitude threshold. In scenarios, where the audio processing model is deployed, the server device may deduce the occurrence of the actionable event by recognizing a distress call from a person. In an example, where the image processing model is used, the server device may deduce that the actionable event has occurred based on an identification from the image, video, or a combination thereof, that an actionable event has occurred. For instance, the image or video may show an actionable event, such as a falling of a storage rack and/or storage rack lying on a floor of the warehouse, falling of a heavy item and/or a heavy item lying on the floor of the warehouse, and the like.

At step 508, if the actionable event has not been deduced, the server device may repeat the step 504. If, at step 508, the actionable event has been deduced, at step 510, the server device may determine a preliminary location of the occurrence of the actionable event. The preliminary location may be determined based on an instantaneous position of the UAV at the time of transmitting the signal.

At step 512, the server device may obtain inputs from a set of static sensors located in proximity of the preliminary location of the occurrence of the actionable event in the warehouse. The set of static sensors may correspond to the static sensors 104. The set of static sensors may be one or more static sensors that may be used. The set of static sensors may also be of one or more types. The set of static sensors may include one or more sound sensors, one or more image capturing device, or a combination thereof. In an example, the server device may determine that the set of sensors are in proximity of the preliminary location if the set of sensors are within a threshold distance from the preliminary location. For instance, assume that the preliminary location is within 50 metre (m) radial distance from a storage rack, such as the storage rack C2. Further, assume that the threshold distance is 50 m radial distance from the preliminary location. The server device may request the inputs from the set of sensors that is within the 50 m radial distance from the 50 m radial distance from the storage rack C2.

At block 514, the server device may process the inputs from the set of static sensors to verify the occurrence of the actionable event in the warehouse. In an example, the processing may be similar to the processing performed at step 506. Further, assume, for example, that the inputs are received from the imaging sensors, such as still cameras. In some examples, the images from one or more imaging sensors may show the storage rack lying on the ground. In this regard, the server device may verify the occurrence of the actionable event in the warehouse.

At block 516 the server device may determine a verified location of the occurrence of the actionable event in response to the verification of the occurrence of the actionable event. The verified location may be determined based on the preliminary location of the occurrence of the actionable event and an actual location of the set of static sensors within the warehouse. For instance, assume that the preliminary location is determined as 50 m radial distance from the storage rack, such as the storage rack C2. Assume that two static sensors, disposed at 50 m radial distance from the 50 m radial distance from the storage rack C2 are used for the verification of the occurrence of the actionable event. Specifically, one static sensor may be disposed at 20 m linear distance from the storage rack C2 and another static sensor may be disposed at 15 m linear distance from the storage rack C2. The linear distance may indicate distance in a particular direction, such as front direction, back direction, left direction, right direction, top direction, bottom direction, and the like. For instance, 20 m linear distance from the storage rack may indicate 20 m distance in front of the storage rack C2, 20 m distance from back of the storage rack C2, 20 m distance on a left side of the storage rack C2, 20 m distance on a right side of the storage rack C2, 20 m distance from the storage rack C2 in a top direction, 20 m distance from the storage rack C2 in a bottom direction, or any combination thereof. Based on actual location of the distance of the set of static sensors, the verified location of the occurrence of the actionable event may be determined.

In an example, the server device may determine an actual location of a relevant set of static sensors from the set of static sensors. The processing unit may identify the relevant set of static sensors from the set of static sensors based on inputs from the relevant set of static sensors being usable for verification of the occurrence of the actionable event. For instance, assume that inputs from three static sensors, such as imaging sensor, are obtained by the processing unit. A first imaging sensor may be disposed at 10 m linear distance from the storage rack C2, a second imaging sensor may be disposed at 15 m linear distance from the storage rack C2, and a third imaging sensor may be disposed at 50 m linear distance from the storage rack C2. The processing unit may process the inputs from each of these imaging sensors and determine a relevant set of static sensors based on the inputs. It may be identified that the image captured by the first imaging sensor may include an image of the storage rack C2 lying on the floor of the warehouse in the whole portion of the image. The second imaging sensor may provide an image of the storage rack C2 lying on the floor of the warehouse in at least some portion of the image. The third imaging sensor may not include any image of the storage rack C2 lying on the floor. In this regard, the processing unit may determine that only the first imaging sensor and the second imaging sensor are relevant, and the third imaging sensor is irrelevant for the determination of the verification of the occurrence of the actionable event. Further, based on the inputs from the first imaging sensor and the second imaging sensor, the server device may verify the occurrence of the actionable event in the warehouse. In another example, if the same type of input is received from a plurality of static sensors, then the processing unit may use the input from the static sensor from which the input was received earliest. For instance, assume that the first imaging sensor and the second imaging sensor both depict the image of the storage rack C2 lying on the floor of the warehouse in the whole portion of the image. Further, assume that the image from the first imaging sensor was received earlier than the second imaging sensor. In this scenario, the processing unit may determine that only the first imaging sensor is relevant and the second imaging sensor is irrelevant for the determination of the verification of the occurrence of the actionable event. Further, based on the inputs from the first imaging sensor, the server device may verify the occurrence of the actionable event in the warehouse.

Further, the server device may determine, in response to the verification of the occurrence of the actionable event, the verified location of the occurrence of the actionable event based on the preliminary location of the occurrence of the actionable event and the actual location of the relevant set of static sensors. In this regard, the server device may determine an actual location of the relevant set of the static sensors and determine the verified location of the occurrence of the actionable event. For instance, upon determining that the first imaging sensor and the second imaging sensor are relevant set of static sensors, the server device may determine the verified location based on the preliminary location being within 50 m radial distance from the storage rack C2, the first imaging sensor being within 10 m linear distance from the storage rack C2, and the second imaging sensor being within 15 m linear distance from the storage rack C2. In this scenario, the server device may determine the verified location as a pre-determined linear distance, for example, 2 m linear distance from the location of the storage rack C2.

At block 518, the server device may trigger an alert for sending an alert to indicate the occurrence of the actionable event. The alert may include the verified location of the occurrence of the event. Upon the triggering, the event response system may alert teams, such as an emergency rescue team, to address the actionable event, as is explained in detail with reference to FIG. 2. In an example, the server device may provide guidance instructions to the people stuck in the warehouse, to the emergency rescue team to reach the people stuck in the warehouse, and the like, as is explained with reference to FIG. 2.

In some examples, the event response system may instruct one or more equipment disposed at a location of the occurrence of the warehouse to address the actionable event. For instance, the event response system may instruct one or more fire extinguishers disposed at locations proximate to the occurrence of the actionable events to actuate, thereby, dousing fire, such as extinguish the fire by operation thereof. In some examples, the event response system may instruct an indoor facility planning unit to change a plan corresponding to an operation of the indoor facility. For instance, the event response system may instruct the WMS to change a work plan of the worker that is supposed to work at the location of the occurrence of the occurrence of the actionable event to work at a different location and/or change the work timings of the workers that are supposed to work at the location of the occurrence of the actionable event. In another example, the event response system may instruct a warehouse execution system (WES) to change a warehouse execution plan.

Although, in the above examples, the method 500 is explained to be performed by the server device 201-1, the method 500 may be performed by the UAV.

In the above examples, the threshold distance and the preliminary location are explained with reference to the radial distance, the threshold distance and the preliminary location can also be in terms of linear distance or a combination of linear distance and a radial distance. Similarly, the actual location of the set of the static sensors were explained in terms of linear distance. However, the actual location of the set of the static sensors can also be in terms of radial distance or a combination of linear distance and radial distance.

Figure 6:
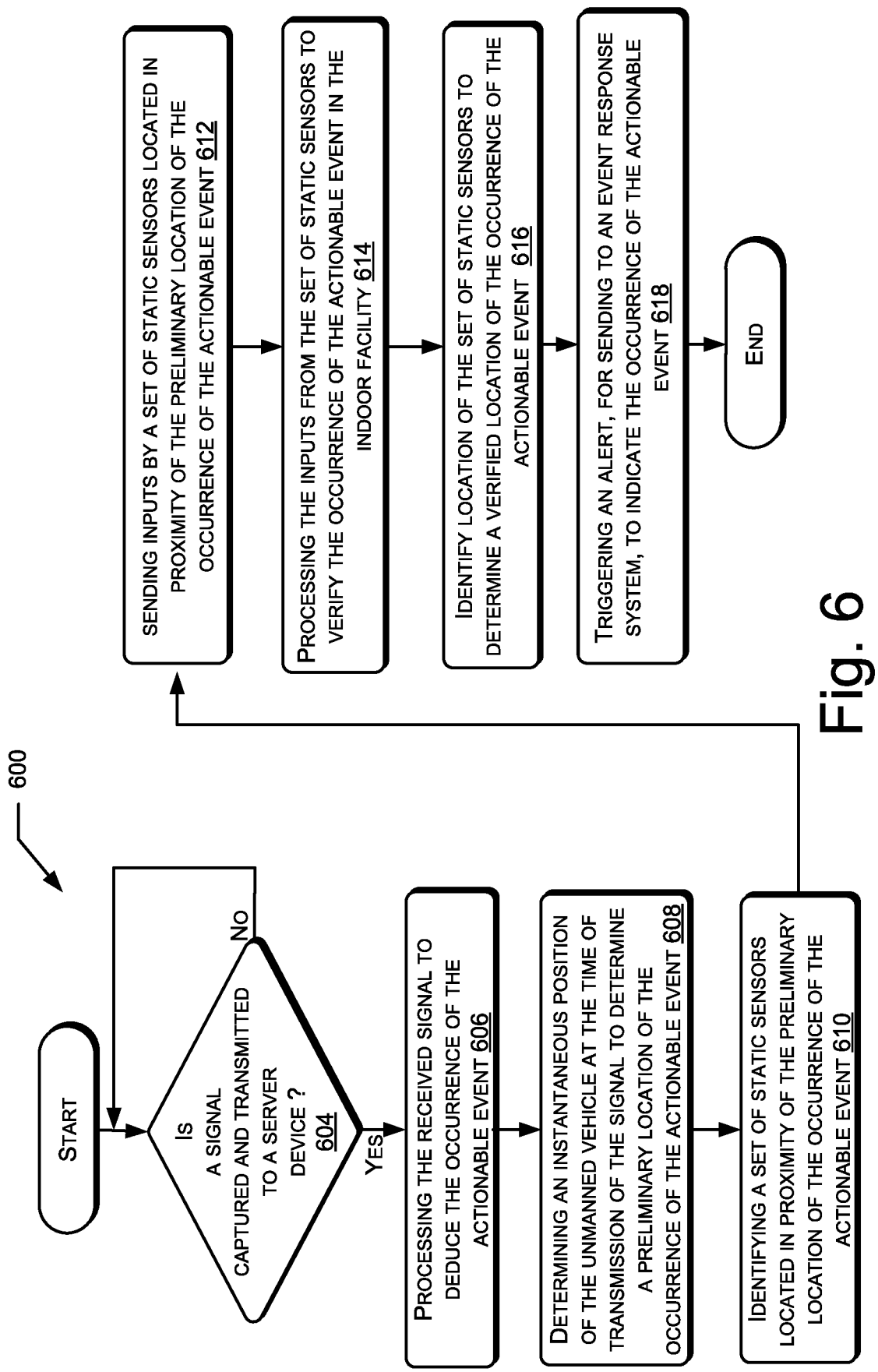
FIG. 6 illustrates a method for response management in an indoor facility, according to an example implementation of the present subject matter.

FIG. 6 illustrates a method 600 for response management in an indoor facility, according to an example implementation of the present subject matter. The order in which the method 600 is described is not intended to be construed as a limitation, and any number of the described method blocks may be combined in any order to implement the method 600, or an alternative method. Furthermore, the method 600 may be implemented by processor(s) or computing device(s) through any suitable hardware, non-transitory machine-readable instructions, or a combination thereof.

It may be understood that steps of the method 600 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. The indoor facility may correspond to the warehouse 100. The method 600 may be performed by components of the warehouse 100, such as the unmanned vehicle 102, the server device 201-1, and the set of static sensors 104.

At step 604, it may be determined if the unmanned vehicle has captured a signal and transmitted the signal to the server device. The transmitted signal may correspond to signal from environment of the warehouse that may enable detection of the occurrence of the actionable event. The signal may be, for example, an audio signal, a visual signal, or a combination thereof. For example, the signal may be an image or a video of a space within the warehouse, a sound occurring in a space within the warehouse, and so on. Hereinafter, the unmanned vehicle will be explained with reference to the UAV.

If it is determined that if the signal is not captured or the signal is captured and not transmitted, the method 600 may repeat the step 604. If the signal is captured and transmitted by the UAV to the server device, the received signal may be processed by the server device to deduce the occurrence of the actionable event, at step 606. The processing may include comparison of an amplitude threshold with an amplitude of the received signal, use of an audio processing model, use of an image processing model, or a combination thereof, as is explained with reference to FIG. 5.

At step 608, an instantaneous position of the UAV at the time of transmission of the signal may be determined to determine a preliminary location of the occurrence of the actionable event. The preliminary location may be, for example, an approximate location of the occurrence of the actionable event.

For instance, assume that the location of the UAV is proximate a storage rack, such as a storage rack C2. During the movement of the UAV near the storage rack, the UAV transmits a signal based on which the occurrence of the actionable event is deduced by the server device. In this regard, the server device may correspond a time instance at which the signal was received from the UAV and identify the instantaneous position of the UAV at that time instance. Accordingly, it may be determined that the preliminary location of the occurrence of the actionable event may be proximate the storage rack C2, such as at a first distance from the storage rack C2. For example, the server device may determine the preliminary location as being within 50 m radial distance from the storage rack C2. In an example, the instantaneous position of the UAV may be determined by the server device. In another example, the instantaneous position of the UAV may be determined by the UAV and may be transmitted to the server device.

At step 610, in response to the determination of the preliminary location, the server device may identify a set of static sensors located in proximity of the actionable event. The set of static sensors may correspond to the static sensors 104. The set of static sensors may be one or more static sensors that may be used. In an example, the server device may determine that the set of sensors are in proximity of the preliminary location if the set of sensors are within a threshold distance from the preliminary location.

At step 612, the inputs may be sent by the set of static sensors located in the proximity of the preliminary location of the occurrence of the actionable event. In an example, the inputs may be sent directly to the server device. In another example, the inputs may be sent to the server device through the UAV.

At step 614, the server device may process the inputs to verify the occurrence of the actionable event in the warehouse. If the inputs are obtained from at least one sound sensor, the server device may deploy an audio processing model to process the inputs to verify the occurrence of the actionable event. The audio processing model may be utilized in scenarios, such as a distress call from a person in the warehouse due to events, such as a fire breakout, blocking of a path in the warehouse, accidents occurred to the personnel, like falling of a rack in the warehouse on the personnel, falling of a storage rack, falling of a heavy item from the storage rack, breaking of an item, falling of an item on a person, and the like.

The audio processing model being a machine learning-based model, such as a voice-recognition model. The audio processing model may be trainable to identify voice, sounds, and/or words from the inputs. In an example, the server device may recognize voice, sounds, and/or words that correspond to a distress call from a person, falling of a storage rack, falling of a heavy item from storage rack, and the like. If the server device recognizes voice, sounds, and/or words that correspond to an actionable event, then the server device may verify the occurrence of the actionable event. For example, if the server device recognizes a word "help" by the processing the inputs, the server device may verify the occurrence of the actionable event.

In some scenarios, such as falling of a storage rack, falling of a heavy item from the storage rack, breaking of an item, falling of an item on a person, and the like, the processing may be performed based on an amplitude threshold. For instance, the server device may compare an amplitude of the obtained inputs with an amplitude threshold for the processing. In an example, if the amplitude of the obtained inputs is greater than the amplitude threshold, the server device may verify the occurrence of the actionable event.

If the inputs are obtained from at least one imaging sensor, the server device may deploy an image processing model to process the inputs. The image processing model may be utilized in scenarios, such as a distress call from a person in the warehouse due to events, such as a fire breakout, blocking of a path in the warehouse, accidents occurred to the personnel, like falling of a rack in the warehouse on the personnel, falling of a storage rack, falling of a heavy item from the storage rack, breaking of an item, falling of an item on a person, and the like. The image processing model may be a machine learning-based model. The image processing model may be trainable to identify images and/or videos that correspond to a distress call from a person, break out of a fire, falling of a storage rack, falling of a heavy item from the storage rack, and so on. If the server device recognizes images and/or videos that correspond to an actionable event, the server device may verify the occurrence of the actionable event. For example, if the server device recognizes a fire breaking out in an image and/or a video, the server device may verify the occurrence of the actionable event.

At step 616, the server device may identify the location of the set of static sensors to determine a verified location of the occurrence of actionable event. The verified location may be an accurate location of the occurrence of the actionable event. The server device may identify the location of the set of static sensors using a route map of the warehouse. In an example, the verified location may be determined based on the preliminary location of the occurrence of the actionable event and an actual location of the set of static sensors within the warehouse.

In an example, the server device may determine a relevant set of static sensors. For instance, assume that inputs from three static sensors, such as sound sensors, are obtained by the processing unit. A first sound sensor may be disposed at 10 m distance from the storage rack C2, a second sound sensor may be disposed at 15 m distance from the storage rack C2, and a third sound sensor may be disposed at 50 m distance from the storage rack C2. The processing unit may process the inputs from each of these sensors and determine a relevant set of static sensors based on the inputs. For instance, based on the processing, it may be identified that the inputs from each of the first sound sensor and the second sound sensor may include a distress call from a person and the third sound sensor may not include any distress call from a person. Accordingly, the server device may determine that the first sound sensor and the second sound sensor may be the relevant sound sensors and that the third sound sensor may be irrelevant sound sensor. In addition, from the first sound sensor is an actual location of a relevant set of static sensors from the set of static sensors. The processing unit may identify the relevant set of static sensors from the set of static sensors based on inputs from the relevant set of static sensors being usable for verification of the occurrence of the actionable event. Further, based on the inputs from the first sound sensor and the second sound sensor, the server device may verify the occurrence of the actionable event in the warehouse.

Further, the server device may determine, in response to the verification of the occurrence of the actionable event, the verified location of the occurrence of the actionable event based on the preliminary location of the occurrence of the actionable event and the actual location of the relevant set of static sensors. In this regard, the server device may determine an actual location of the relevant set of the static sensors and determine the verified location of the occurrence of the actionable event. For instance, upon determining that the first sound sensor and the second sound sensor are relevant set of static sensors, the server device may determine the verified location based on the preliminary location being within 50 m radial distance from the storage rack C2, the first sound sensor being within 10 m linear distance from the storage rack C2, and the second sound sensor being within 15 m linear distance from the storage rack C2.

At block 618, the server device may trigger an alert for sending an alert to indicate the occurrence of the actionable event. The alert may include the verified location of the occurrence of the event. In an example, the triggering comprises prompting illumination of a selected light from amongst a plurality of lights disposed at a plurality of locations in the warehouse. The selected light may be disposed in proximity to the verified location of the occurrence of the actionable event. The server device may identify a light among the plurality of lights that is within a threshold distance from the verified location of the occurrence of the actionable event to determine that the light is in proximity to the verified location and select the light for illumination. For instance, assume that the verified location is 10 m linear distance from the storage rack C2. The server device may prompt illumination of a selected light that is within 15 m radial distance from the 10 m linear distance from the storage rack C2. The illumination of the light may enable guiding the emergency rescue team to identify the verified location of the occurrence of the actionable event and/or identify people stuck due to the occurrence of the actionable event. The lights may correspond to the lights 120. In an example, instead of illuminating the light in the warehouse, the server device may transmit a signal to the UAV to illuminate the lights of the UAV. The lights of the UAV may correspond to the lights 414.

Although in the above examples, the steps 606, 610, 614, 616, 618 are explained to be performed by the server device, in some scenarios, the steps 606, 610, 614, 616, 618 may be performed by the UAV.

Figure 7:
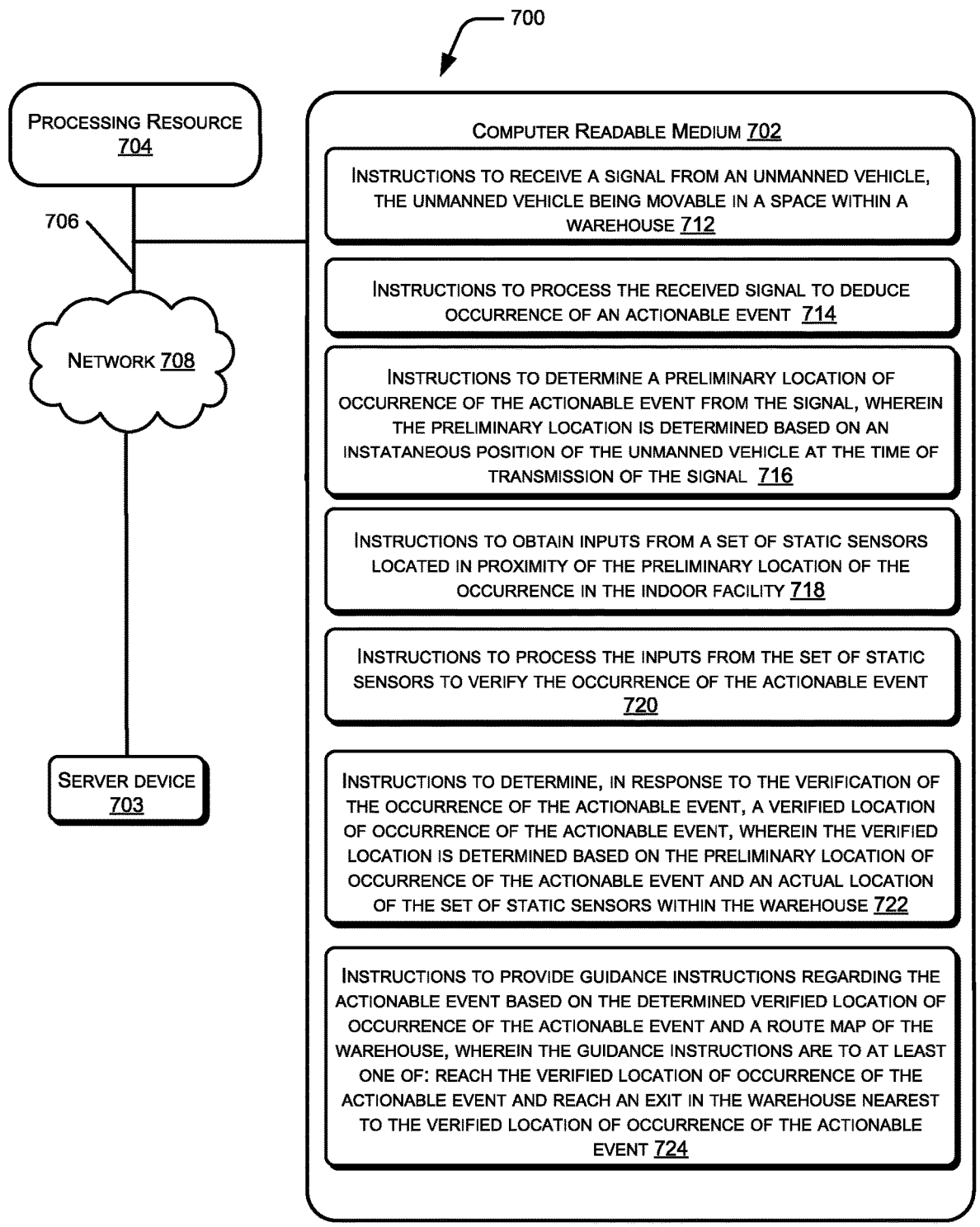
FIG. 7 illustrates a computing environment, implementing a non-transitory computer-readable medium for indoor facility management, according to an example implementation of the present subject matter.

FIG. 7 illustrates a computing environment, implementing a non-transitory computer-readable medium for indoor facility management, according to an example implementation of the present subject matter.

In an example, the non-transitory computer-readable medium 702 may be utilized by the server device 703. The server device 703 may correspond to the server device 201-1 or the server device 201-2. The computing device 703 may be implemented in a public networking environment or a private networking environment. In an example, the computing environment 700 may include a processing resource 704 communicatively coupled to the non-transitory computer-readable medium 702 through a communication link 706.

In an example, the processing resource 704 may be implemented in a device, such as the server device 703. The processing resource 704 may be the processing unit 302. The non-transitory computer-readable medium 702 may be, for example, an internal memory device of the server device 703 or an external memory device. In an implementation, the communication link 706 may be a direct communication link, such as any memory read/write interface. In another implementation, the communication link 706 may be an indirect communication link, such as a network interface. In such a case, the processing resource 704 may access the non-transitory computer-readable medium 702 through a network 708. The network 708 may be a single network or a combination of multiple networks and may use a variety of different communication protocols. The processing resource 704 and the non-transitory computer-readable medium 702 may also be communicatively coupled to the server device 703 over the network 708.

In an example implementation, the non-transitory computer-readable medium 702 includes a set of computer-readable instructions to perform an action corresponding to an indoor facility management. The set of computer-readable instructions can be accessed by the processing resource 704 through the communication link 706 and subsequently executed to perform acts to provide feedback to the actuating object.

Referring to FIG. 7, in an example, the non-transitory computer-readable medium 702 includes instructions 712 to receive a signal from the unmanned vehicle. The unmanned vehicle may correspond to the unmanned vehicle 102. Hereinafter, the unmanned vehicle may be explained with reference to the UAV. The signal may be, for example, audio signal, a visual signal, or a combination thereof. The signal may be, for example, audio signal, a visual signal, or a combination thereof.

The non-transitory computer-readable medium 702 includes instructions 714 to process the received signal to deduce the occurrence of the actionable event. The processing may be similar to the processing of the signal as explained with reference to FIG. 5 and FIG. 6. The non-transitory computer-readable medium 702 includes instructions 716 to determine a preliminary location of the occurrence of the actionable event from the signal. The preliminary location may be determined based on an instantaneous position of the unmanned vehicle at the time of transmission of the signal.

The preliminary location may be an approximate location of the occurrence of the actionable event. In an example, the instantaneous position of the UAV may be determined using a localization beacon from amongst a plurality of localization beacons located in the warehouse. The determination of the instantaneous position of the UAV may be determined by the UAV.

As mentioned earlier, the localization beacons may broadcast signals on regular intervals. The corresponding beacon signal receiving unit may receive the signal from the beacon and process the signal. Based on the location of the localization beacon, which is already known, the instantaneous position of the UAV may be determined. In an example, the UAV may determine that the instantaneous position of the UAV based on the location of the Bluetooth beacon from which the signal was received by the UAV and based on a strength of the signal received from the Bluetooth beacon. For instance, assume that there a plurality of Bluetooth beacons disposed at various locations in the warehouse with position of each Bluetooth beacon being already known. Further, assume that UAV includes a Bluetooth receiver. In this regard, when the UAV passes through one of the Bluetooth beacons, the UAV may receive the signals broadcast by the Bluetooth beacon proximate that location.

Further, the higher the strength of the signal, the closer the UAV is to the Bluetooth beacon; and the lower the strength of the signal, the further the UAV is to the Bluetooth beacon. In an example, to enable determination of the instantaneous position of the UAV, the UAV may store locations of each of the plurality of localization beacons. In another example, the UAV may transmit, to the server device, an identifier corresponding to the localization beacon from where the signal was received by the UAV. The server device may transmit to the UAV the location of the localization beacons corresponding to the identifier. In response to receiving the location of the localization beacon, the UAV may determine the instantaneous position. The UAV may send the instantaneous position of unmanned vehicle at the time of transmission of the signal by the unmanned vehicle to the server device.

In an example, instead of determining the location, the UAV may transmit, to the server device, an identifier corresponding to the localization beacon and the strength of the signal from the localization beacon received by the UAV. The Server device may determine the location of the localization beacon corresponding to the identifier received from the UAV. Further, the server device may determine the instantaneous position of the UAV based on the location of the localization beacon and the strength of the signal received from the localization beacon by the UAV.

The non-transitory computer-readable medium 702 includes instructions 718 to obtain inputs from a set of static sensors located in proximity of the preliminary location of the occurrence of the warehouse. The set of static sensors may correspond to the static sensors 104.

The non-transitory computer-readable medium 702 includes instructions 720 to process the inputs from the set of static sensors to verify the occurrence of the actionable event. The processing of the inputs and the verification of the occurrence of the actionable event may include comparison of an amplitude of the obtained inputs with an amplitude threshold, deployment of an audio processing model, deployment of an image processing model, or a combination thereof, as is explained with reference to FIG. 5 and FIG. 6.

The non-transitory computer-readable medium 702 includes instructions 722 to determine, in response to the verification of the occurrence of the actionable event, a verified location of the occurrence of the actionable event. The verified location may be determined based on the preliminary location of the occurrence of the actionable event and an actual location of the set of static sensors within the warehouse. As described earlier with reference to FIG. 5 and FIG. 6, the server device may determine a relevant set of static sensors and determine the verified location of the occurrence of the actionable event based on the preliminary location of the occurrence of the actionable event and the actual location of the relevant set of static sensors.

The non-transitory computer-readable medium 702 includes instructions 724 to provide guidance instructions regarding the actionable event based on the determined verified location of the occurrence of the actionable event and a route map of the warehouse. The guidance instructions may be to reach the verified location of the occurrence of the actionable event, to reach an exit in the warehouse nearest to the verified location of the occurrence of the actionable event, or a combination thereof. For instance, if people are stuck in the warehouse due to break out of fire at some portion of the warehouse, a signal may be sent to a light controller to actuate the one or more lights at the location proximate to the location of the actionable event. In particular, the signal may be to actuate the lights in a predetermined pattern. This may enable identification of location of the actionable event occurrence for the emergency rescue team. In some scenarios, guidance instructions may guide the people stuck in the warehouse to take an appropriate path, such as a safe path to follow to reach the entry/exit of the warehouse, a safe path to reach the nearest exit of the warehouse, a path that should be avoided due to occurrence of the critical event, a safe place to reach in the warehouse, and/or appropriate route to be taken to reach the emergency rescue team. In an example, the guidance instructions regarding the appropriate path may be provided by sending instructions to the light controller to control the lights disposed along the appropriate path in a predetermined path. The light controller may correspond to the light controller 118 and the lights may correspond to the lights 120. In another example, the guidance instructions may be in the form of audio alerts, such as a public announcement unit through an audio output unit, such as a speaker disposed in the warehouse. The audio output unit may correspond to the audio output unit 204. In other examples, there may be a plurality of signboards, such as digital signboards, that may be instructed by the event response system to indicate the appropriate path. In an example, instead of providing guidance to the people stuck at the location of the occurrence of the critical event, guidance may be provided to the emergency rescue team to reach the location of the occurrence of the actionable event to safely evacuate the people stuck.

In the above examples, the provision of guidance is explained with reference to the lights in the warehouse and the audio output unit in the warehouse. In some examples, the guidance may be provided using the lights of the UAV and/or the audio output unit of the UAV. The lights may correspond to the lights 414 and the audio output unit may correspond to the audio output unit 416.

Although in the above examples, the provision of guidance is explained to be performed by the server device. In some examples, an event response system may provide the guidance instructions. For instance, the server device may trigger an alert for sending to the event response to indicate the occurrence of the actionable event. The event response system may provide guidance instructions in response to the triggering.

Although in the above examples, the instructions 714-724 are explained to be performed by the server device, in some scenarios, the steps 714-724 may be performed by the UAV. For instance, prior to performing the step 714, the UAV may receive signal from the warehouse by using the sensors integrated with the UAV and/or from the set of static sensors disposed at various locations. Further, in such scenarios, in an example, the step 712 may be performed for further storing by the server device. In another example, the step 704 may not be performed.

In the above examples, the determination of the preliminary location of the occurrence of the actionable event is performed using the signal received from the UAV and the verification of the occurrence of the actionable event and determination of the verified location of the occurrence of the actionable event are performed using inputs obtained from the set of static sensors. However, it may be understood that the preliminary location of the occurrence of the actionable event may be performed using the inputs obtained from the set of static sensors and the verification of the occurrence of the actionable event and determination of the verified location of the occurrence of the actionable event may be performed signal received from the UAV or any combination thereof.

Figure 8:
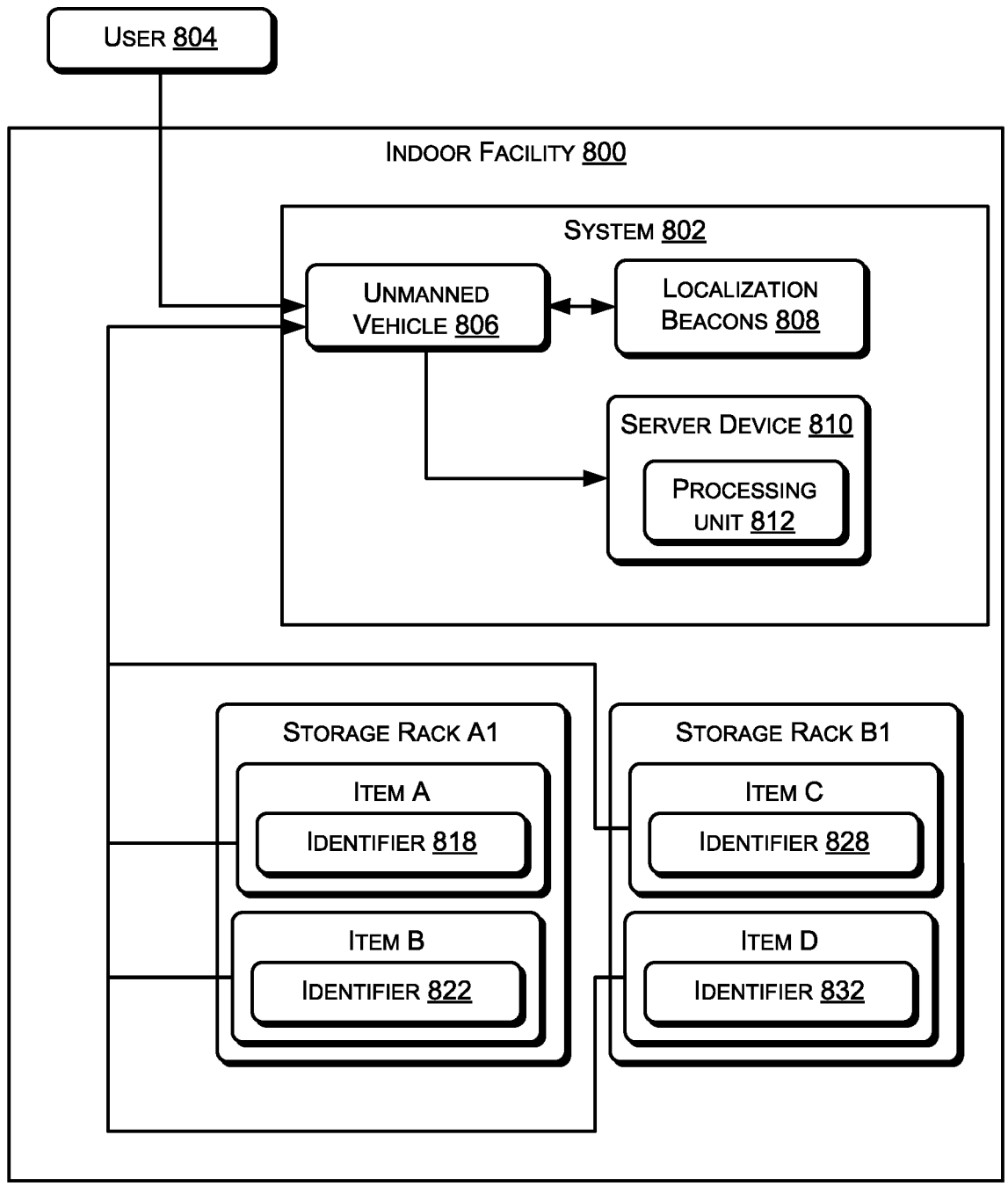
FIG. 8 illustrates an indoor facility, according to an example implementation of the present subject matter.

FIG. 8 illustrates an indoor facility 800, according to an example implementation of the present subject matter. The indoor facility may correspond to the indoor facility 100. Hereinafter, the indoor facility will be explained with reference to warehouse. The warehouse 800 may include a plurality of storage racks A, B to store one or more items, such as raw materials, finished products, packed materials, and the like. For instance, the storage rack A1 may store an item A, item B. The storage rack B1 may store an item C and an item D. Items A, B, C, and D may be same or different types of items. For instance, the items A and B may be books and items C and D may be electronic gadgets. The storage racks A1 and B1 may correspond to the storage racks A1-C3.

Each of the items A, B, C, and D may include an identifier that is to enable unique identification of the item. The identifier may be, for example, such as a Quick Response (QR) code, a bar code, a Radio Frequency Identification (RFID) tags, or a combination thereof.

The warehouse 800 may include a system 802 for indoor facility management that may enable provision of guidance to enable location and distribution of the items in the warehouse 800. In some circumstances, a user 804, such as a worker in the warehouse, may only have an information, such as an identifier, corresponding to an item in the warehouse 800. Further, the item may have to be picked for distribution thereof. However, it may not be readily known as to where the item is located within the warehouse 800, which tools are to be used and/or the number of persons required to pick the item for distribution since weight and size of the item may be unknown. For instance, assume that the user 804 has an information about the identifier 818 corresponding to item A. However, the user 804 may not know what the item A is and the location of the item A.

In this regard, the system 802 may enable identification and location of the item to enable distribution of the items A, B, C, D. The system 802 may include server device 810 and an unmanned vehicle 806. The server device may correspond to the server device 201-1 or the server device 201-2. The unmanned vehicle 806 may correspond to the unmanned vehicle 102. Hereinafter, the unmanned vehicle 806 will be explained with reference to the UAV.

The UAV 806 may receive an input regarding an identifier corresponding to an item that is to be moved. For instance, the user 804 may send the identifier to the UAV 806 and to the server device 810. In an example, the user 804 may send the identifier only to the server device 810 and the server device 810 may transmit the identifier to the UAV 806. The UAV 806 may scan the plurality of items A, B, C, D to determine the identifier 818, 822, 828, 832 corresponding to each of the plurality of items A, B, C, D in the warehouse 800 and transmit the determined identifier corresponding to each of the plurality of items A, B, C, D. The UAV 806 may transmit each identifier 818, 822, 828, 832 to the server device 810. The server device 810 may, for example, process the identifiers received from the UAV 806 and identify the item A, B, C, D to be moved based on the processing. The server device 810 may receive the identifiers 818, 822, 828, and 832. The server device 810 may compare the identifiers 818, 822, 828, and 832 with the identifier 818 received from the user 804 to determine that the identifier corresponds to Item A. In this regard, the server device 810 may utilize a database (not shown in FIG. 8) that is stored in the server device 810 while loading the items in the warehouse 800. The database may include the identifier 818, 822, 828, 832 and the corresponding item A, B, C, D. For instance, the database may include the item A and its corresponding identifier 818, and so on.

In an example, the server device 810 may also identify the location of the item A, B, C, D based on an instantaneous position of the UAV at the time of transmission of the identifier corresponding to the item. The instantaneous position of the UAV may be determined as explained with reference to FIG. 4 and FIG. 7.

In addition, the server device 810 may determine a plurality of parameters corresponding to movement of the item A, B, C, D. For instance, the plurality of parameters may include tools for the movement of the item A, B, C, D and number of resources used for movement of the item A, B, C, D. In some examples, the plurality of parameters may also include weight of the item A, B, C, D, size of the item A, B, C,D, and size of the package material having the item A, B, C, D.

In an example, the plurality of parameters may be encoded in the identifier. However, in other examples, the plurality of parameters may be determined using information available in the database. The database may include weight of the items A,B,C,D, size of the items A,B,C,D, size of the package material having the item A,B,C,D, kind of tools required for moving the item A,B,C,D, number of resources required for moving the item A,B,C,D, and the like. Therefore, upon the receipt of the identifier from the UAV 806, the server device 810 may use the database to identify the weight of the item A,B,C,D, size of the item A,B,C,D, and the like.

Although, in the above example, the UAV 806 is explained to scan the items, in some examples, instead of the UAV, the scanning may be performed by a set of static sensors, such as imaging sensors, that are disposed at various locations in the warehouse. The set of static sensors may correspond to the set of static sensors.

Further, in the above examples, the UAV 806 is to scan and transmit the identifier to the server device 810 for the processing. However, in other examples, the UAV 806 may process the identifier to determine the item A,B,C,D that is to be moved and the plurality of parameters corresponding to movement of the item A,B,C,D. In this regard, the UAV 806 may include the database, for instance, in a memory of the UAV.

Figure 9:
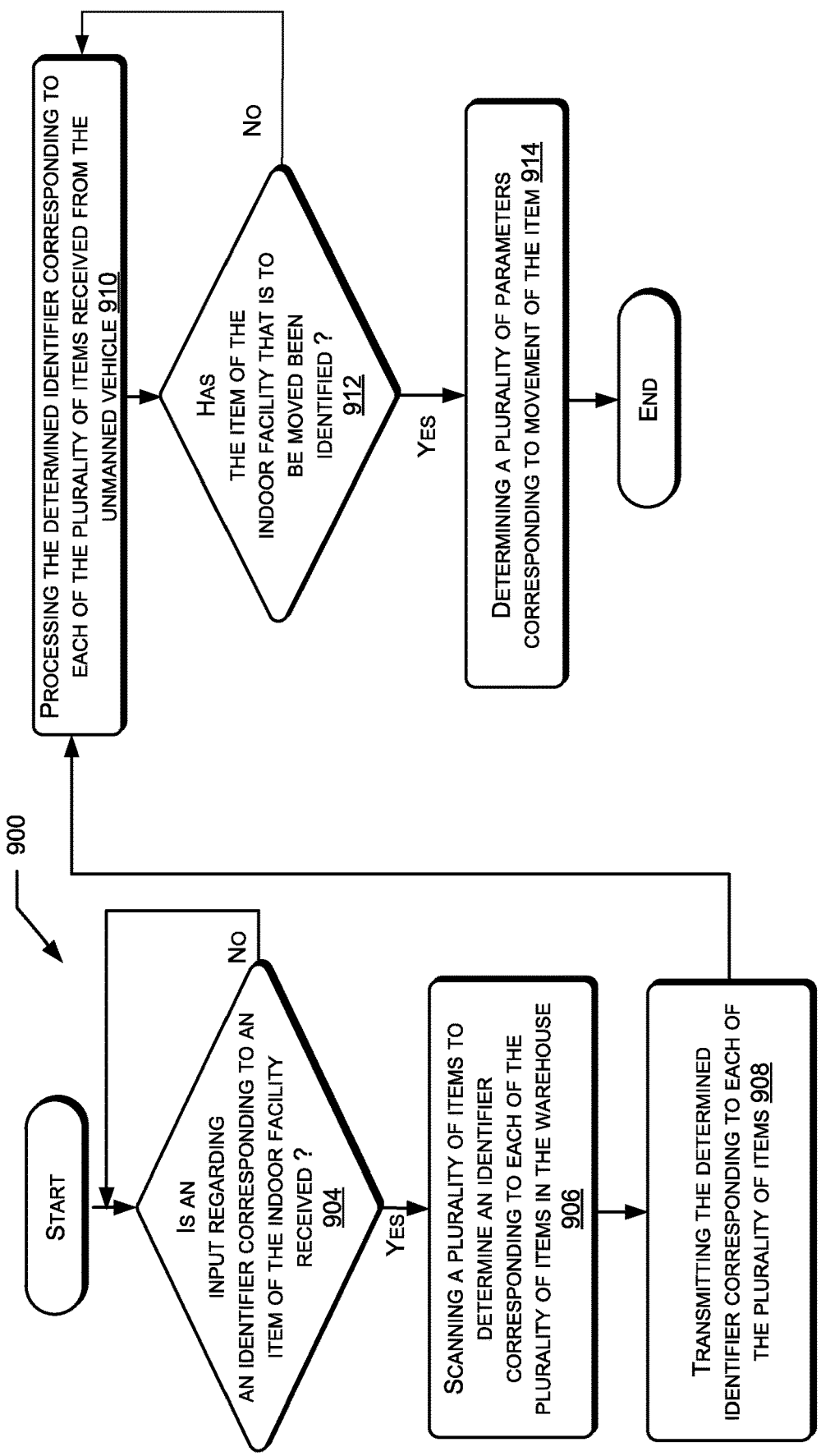
FIG. 9 illustrates a method for response management, according to an example implementation of the present subject matter.

FIG. 9 illustrates a method 900 for response management, according to an example implementation of the present subject matter. The order in which the method 900 is described is not intended to be construed as a limitation, and any number of the described method blocks may be combined in any order to implement the method 900, or an alternative method. Furthermore, the method 900 may be implemented by processor(s) or computing device(s) through any suitable hardware, non-transitory machine-readable instructions, or a combination thereof.

It may be understood that steps of the method 900 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. The method 900 may be performed by the system 802.

At step 904, it may be determined if an input regarding an identifier corresponding to an item of the warehouse that is to be moved is received. The input may be sent by the user. For instance, assume that the user has sent an identifier that corresponds to the item A. However, the user does not know that identifier corresponds to Item A, what item A is, and the location of the item A. The user may send the input regarding the identifier to the server device as well as to the UAV. In an example, the user may send the input only to the server device and the server device may transmit the input to the UAV. The UAV may correspond to the UAV 806.

At step 906, the UAV may scan a plurality of items to determine an identifier corresponding to each of the plurality of items in the warehouse. For instance, the UAV may scan the items, such as item A, B, C, and D to determine the corresponding identifiers 818, 822, 828, 832

At step 908, the UAV may transmit the determined identifier corresponding to each of the plurality of items to the server device. For instance, the UAV may transmit the identifiers 818, 822, 828, 832 to a server device. In an example, the UAV may also transmit, to the server device, the input corresponding to the identifier that the user has requested the UAV. The server device may correspond to the server device 810.

At step 910, the server device may process the determined identifier that corresponds to each of the plurality of items received from the UAV. For the processing, the server device may compare the identifiers received with the identifier received from the user. In this regard, the server device may utilize a database that is stored in the server device while loading the items. The database may include the identifier and the corresponding item. For instance, the database may include the item A and its corresponding identifier 818, and so on. Accordingly, the server device may compare the identifiers 818, 822, 828, and 832 received with the identifier 818 received from the user for the processing. In an example, in response to the processing, the server device may also identify the location of the item. The location of the item may be determined based on the database, which may include the location of each of the plurality of items in the warehouse. For instance, upon identifying the identifier corresponds to the item A, the server device may utilize the database to determine that the item A is located in storage rack A.

In another example, the location of the item may be identified based on an instantaneous position of the UAV at the time of transmission of the identifier corresponding to the item. For instance, upon identifying the identifier corresponds to the item A, the server device may identify the instantaneous position of the UAV at the time of transmission of a signal that corresponds to the identifier of the item A to be moved. The server device may identify that the UAV was at the location of storage rack A during transmission of the signal corresponding to the identifier 818. Therefore, the server device may determine that the item A is located in the storage rack A.

At step 912, it may be determined if the item has been identified. For instance, based on the comparison, the server device may identify that the identifier 818 requested by the user may correspond to the item A. If the item has been identified, the method proceeds to step 914. If at step 914, the item is not identified, the method may proceed to step 910.

Further, at step 914, the server device may determine a plurality of parameters corresponding to movement of the item. The plurality of parameters may include tools for the movement of the item and number of resources used for movement of the item. In some examples, the plurality of parameters may also include weight of the item, size of the item, and size of the package material having the item. In an example, the plurality of parameters may be encoded in the identifier. For instance, the identifier 818 may be encoded with the plurality of parameters. Therefore, upon the identification that it corresponds to the item A, the server device may determine the plurality of parameters. However, in another example, the plurality of parameters may be determined using information available in the database. The database may include weight of the items, size of the items, size of the package material having the item, kind of tools required for moving the item, number of resources required for moving the item, and the like. Therefore, upon the identification of the item, the server device may use the database to identify the weight of the item, size of the item, and the like, corresponding to the item. For instance, the server device may identify that item A is 3 Kgs, is of 10 cm×10 cm size, and so on.

The present subject matter provides an efficient and reliable technique for response management in indoor facilities. The present subject matter enables detection of the actionable event, such as a fire break out in some part of the indoor facility due to various reasons, say due to short circuiting of electrical appliances in the indoor facility or due to a flammable material, stored in the indoor facility, catching fire, an unauthorized person, such as a thief, trying to break into the indoor facility, and the like, by processing the signal received from the unmanned vehicle. Therefore, as soon as the server device processes the signal, it may be able to detect the occurrence of the actionable event. Further, the present subject matter triggers an alert to send to the event response system. Therefore, the event response system may enable taking appropriate action to address the emergency situation in a time bound manner without any delay. Accordingly, the present subject matter enables preventing any damage caused to the indoor facility, such as damages to the resources in the indoor facility and thereby preventing economic impact caused. The present subject matter also prevents further aggravation of the emergency situations. For instance, if a fire breaks out in one part of the warehouse, the present subject matter triggers an alert to the event response indicating occurrence of the fire breakout. Accordingly, the event response system may enable taking appropriate action, such as dousing fire using fire extinguishers. This prevents spreading of fire to the entire warehouse and prevents damage that may be caused to the goods. In some scenarios, this ensures safety of the personnel stuck in the portion of indoor facility due to the occurrence of the actionable event.

Unlike conventional systems, where indications, such as alarms provided to alert in the event of an emergency situations, may be missed by the emergency rescue teams due to location constraints, the present subject matter ensures that the alert are sent to the event response system and also provides guidance instructions to address the actionable events. Therefore, the present subject ensures that the indication of the actionable event is not missed. Further, the present subject matter verifies the occurrence of the actionable event based on the inputs from the set of static sensors disposed in the indoor facility. Accordingly, the present subject matter prevents any false alarm regarding the indication of the occurrence of the actionable event. On the other hand, with the present subject matter, the localization of the location of the actionable event is formed accurately. Therefore, the present subject matter enables the emergency rescue personnel to locate the incident easily. This may prevent the delay in taking the necessary action to address such actionable event that is caused due to localization of the location of the event in the indoor facility. By providing guidance instructions regarding the actionable event, the present subject matter enables safe evacuation of the people stuck in the indoor facility due to the occurrence of the actionable event. In some scenarios, the guidance instructions include instructions to reach an exit in the indoor facility nearest to the verified location of the occurrence of the actionable event. This may help in safe evacuation of the people stuck in the indoor facility in scenarios, where the emergency rescue teams are not available for evacuation and/or if it takes time for the emergency rescue teams to reach the location of the actionable event.

The present subject matter also helps in provide guidance to enable location and distribution of items. For example, the present subject matter enables to identify and locate an item in circumstances, where a worker may only have an information, such as an identifier, corresponding to the item in the indoor facility. Further, upon the identification of location of the item, the present subject matter also enables provision of various parameters that are to enable distribution of the item. For instance, the present subject matter provides information regarding weight of the item, size of the item, size of the package material having the item, tools that are to be used to pick the item and/or the number of persons required to pick the item.

Although examples and implementations of present subject matter have been described in language specific to structural features and/or methods, it is to be understood that the present subject matter is not necessarily limited to the specific features or methods described. Rather, the specific features and methods are disclosed and explained in the context of a few example implementations of the present subject matter.

What is claimed is:

1. A server device for indoor facility management, the server device comprising: a processing unit to:
   receive a signal from an unmanned vehicle movable in a space within an indoor facility;
   process the received signal to deduce occurrence of an actionable event;
   determine, from the signal, a preliminary location of the occurrence of the actionable event, wherein the preliminary location is determined based on an instantaneous position of the unmanned vehicle at a time of transmitting the signal;
   obtain inputs from a set of static sensors located in proximity of the preliminary location of the occurrence of the actionable event in the indoor facility;
   process the inputs from the set of static sensors to verify the occurrence of the actionable event;
   determine, in response to the verification of the occurrence of the actionable event, a verified location of the occurrence of the actionable event, wherein the verified location is determined based on the preliminary location of the occurrence of the actionable event and an actual location of the set of static sensors within the indoor facility; and
   trigger an alert, for sending to an event response system, to indicate the occurrence of the actionable event, wherein the alert comprises the verified location of the occurrence of the event.

2. The server device as claimed in claim 1, wherein the signal received from the unmanned vehicle is an audio signal.

3. The server device as claimed in claim 2, wherein the processing unit is to deploy an audio processing model to process the received signal to deduce the occurrence of the actionable event, wherein the audio processing model is a machine learning-based model.

4. The server device as claimed in claim 2, wherein to processing unit is to:
   compare an amplitude of the received signal with an amplitude threshold; and
   deduce the occurrence of the actionable event if the amplitude of the received signal is greater than the amplitude threshold.

5. The server device as claimed in claim 1, wherein the signal from the unmanned vehicle is a visual signal.

6. The server device as claimed in claim 5, wherein the processing unit is to deploy an image processing model to process the received signal to deduce the occurrence of the actionable event, wherein the image processing model is a machine learning-based model.

7. The server device as claimed in claim 1, wherein the set of static sensors comprise at least one of a sound sensor, an imaging sensor, a Bluetooth beacon, a Wireless Fidelity (Wi-fi) beacon, an ultra-wide band (UWB) beacon, a Chirp Spread Spectrum (CSS) beacon.

8. The server device as claimed in claim 1, wherein the processing unit is to:
   determine an actual location of a relevant set of static sensors from the set of static sensors, wherein the processing unit is to identify the relevant set of static sensors from the set of static sensors based on inputs from the relevant set of static sensors being usable for verification of the occurrence of the actionable event; and
   determine, in response to the verification of the occurrence of the actionable event, the verified location of the occurrence of the actionable event based on the preliminary location of the occurrence of the actionable event and the actual location of the relevant set of static sensors.

9. The server device as claimed in claim 1, wherein the server device is one of: a local server device disposed within the indoor facility and a cloud server device.

10. The server device as claimed in 1, wherein the processing unit is to:
instruct, in response to the determination of the verified location of the occurrence of the actionable event, an indoor facility planning unit to alter an operation corresponding to the indoor facility.

11. A method for indoor facility management, the method comprising:
transmitting, by an unmanned vehicle, a signal to a server device operably connected to the unmanned vehicle, the unmanned vehicle being movable in a space within an indoor facility;
processing, by the server device, the signal received from the unmanned vehicle to deduce occurrence of an actionable event;
determining, by the server device, a preliminary location of the occurrence of the actionable event, wherein the preliminary location is determined based on an instantaneous position of the unmanned vehicle at a time of the transmission of the signal by the unmanned vehicle;
obtaining, by the server device, inputs from a set of static sensors in proximity of the preliminary location of the occurrence of the actionable event in the indoor facility;
processing, by the server device, the inputs from the set of static sensors to verify the occurrence of the actionable event;
determining, by the server device, in response to the verification of the occurrence of the actionable event, a verified location of the occurrence of the actionable event, wherein the verified location is determined based on the preliminary location of the occurrence of the actionable event and an actual location of the set of static sensors within the indoor facility; and
triggering, by the server device, an alert for sending to an event response system to indicate the occurrence of the actionable event, wherein the alert comprises the verified location of the occurrence of the event.

12. The method as claimed in claim 11, wherein the obtaining comprises obtaining, by the server device, inputs from at least one sound sensor in proximity of the preliminary location of the occurrence of the actionable event.

13. The method as claimed in claim 12, wherein the inputs from the set of static sensors correspond to audio signals, and wherein the method comprises:
deploying, by the server device, an audio processing model to process the inputs to verify the occurrence of the actionable event, the audio processing model being a machine learning-based model.

14. The method as claimed in claim 11, wherein the obtaining comprises obtaining, by the server device, inputs from at least one imaging sensor in proximity of the preliminary location of the occurrence of the actionable event.

15. The method as claimed in claim 14, wherein the inputs from the set of static sensors correspond to visual signals, and wherein the method comprises:
deploying, by the server device, an image processing model to process the inputs to verify the occurrence of the actionable event, the image processing model being a machine learning-based model.

16. The method as claimed in claim 11, wherein the triggering comprises prompting illumination of a selected light from amongst a plurality of lights disposed at a plurality of locations in the indoor facility, the selected light being disposed in proximity to the verified location of the occurrence of the actionable event.

17. A non-transitory computer-readable medium comprising instructions for indoor facility management, the instructions being executable by a processing resource to:
receive a signal from an unmanned vehicle, the unmanned vehicle being movable in a space within an indoor facility;
process the received signal to deduce occurrence of an actionable event; determine a preliminary location of the occurrence of the actionable event from the signal, wherein the preliminary location is determined based on an instantaneous position of the unmanned vehicle at the time of transmitting the signal;
obtain inputs from a set of static sensors located in proximity of the preliminary location of the occurrence in the indoor facility;
process the inputs from the set of static sensors to verify the occurrence of the actionable event;
determine, in response to the verification of the occurrence of the actionable event, a verified location of the occurrence of the actionable event, wherein the verified location is determined based on the preliminary location of the occurrence of the actionable event and an actual location of the set of static sensors within the indoor facility; and
provide guidance instructions regarding the actionable event based on the determined verified location of the occurrence of the actionable event and a route map of the indoor facility, wherein the guidance instructions are to at least one of:
reach the verified location of the occurrence of the actionable event, and
reach an exit in the indoor facility nearest to the verified location of the occurrence of the actionable event.

18. The non-transitory computer-readable medium of claim 17, wherein to determine the preliminary location of the occurrence of the actionable event based on the instantaneous position of the unmanned vehicle at the time of transmission of the signal by the unmanned vehicle, the instructions are executable by the processing resource:
determine the instantaneous position of the unmanned vehicle using a localization beacon from amongst a plurality of localization beacons located in the indoor facility; and
send the instantaneous position of unmanned vehicle at the time of transmission of the signal by the unmanned vehicle.

19. The non-transitory computer-readable medium of claim 18, wherein to determine the instantaneous position of the unmanned vehicle using a localization beacon, the instructions are executable by the processing resource to:
determine the instantaneous position of the unmanned vehicle using at least one of: a Bluetooth beacon, a Wi-fi beacon, an ultra-wide band UWB beacon, a CSS beacon.

20. The non-transitory computer-readable medium of claim 17, the instructions are executable by the processing resource to provide the guidance instructions in the form of audio alerts.

* * * * *